United States Patent [19]

Ushida et al.

[11] Patent Number: 5,721,793
[45] Date of Patent: Feb. 24, 1998

[54] IMAGE PROCESSING WITH SMOOTH PRODUCTION OF INCLINED LINES AND OTHER FEATURES

[75] Inventors: Katsutoshi Ushida, Machida; Ikuo Sobue, Kawasaki, both of Japan

[73] Assignee: Canon Kabushiki Kaisha, Japan

[21] Appl. No.: 306,538

[22] Filed: Sep. 15, 1994

Related U.S. Application Data

[63] Continuation of Ser. No. 827,984, Jan. 29, 1992, abandoned.

[30] Foreign Application Priority Data

| Feb. 1, 1991 | [JP] | Japan | 3-011970 |
| Feb. 1, 1991 | [JP] | Japan | 3-011971 |
| Feb. 20, 1991 | [JP] | Japan | 3-025969 |

[51] Int. Cl.$^6$ .................................................. G06K 9/32
[52] U.S. Cl. .................................................. 382/300; 358/451
[58] Field of Search .................................. 382/254, 258, 382/298, 141, 300, 290; 345/136, 137; 395/128, 129, 118, 143, 139, 132, 162, 102; 358/462, 451

[56] References Cited

U.S. PATENT DOCUMENTS

| 4,544,264 | 10/1985 | Bassetti et al. | 355/14 R |
| 4,544,922 | 10/1985 | Watanabe et al. | 345/137 |
| 4,571,635 | 2/1986 | Mahmoodi et al. | 358/284 |
| 4,625,222 | 11/1986 | Bassetti et al. | 346/160 |
| 4,712,102 | 12/1987 | Troupes et al. | 340/728 |
| 4,805,033 | 2/1989 | Nishikawa | 358/298 |
| 4,837,562 | 6/1989 | Nishiura et al. | 340/728 |
| 4,878,126 | 10/1989 | Ichikawa | 358/451 |
| 4,903,316 | 2/1990 | Hongo et al. | 358/52 |
| 5,005,139 | 4/1991 | Tung | 358/462 |
| 5,018,024 | 5/1991 | Tanioka | 358/462 |
| 5,073,953 | 12/1991 | Westdijk | 358/462 |
| 5,093,870 | 3/1992 | Watanabe | 345/137 |

*Primary Examiner*—Joseph Mancuso
*Attorney, Agent, or Firm*—Fitzpatrick, Cella, Harper & Scinto

[57] ABSTRACT

The invention relates to an image processing method and apparatus in which, when a binary image is converted to a higher density and interpolated, more effective conversion patterns are proposed and the interpolation upon conversion to higher density is performed by a simple logic operation without using a pattern memory. One original pixel is subdivided into $2^n$ portions (where n is an integer) in a main scanning direction and/or $2^m$ portions (where m is an integer) in a subordinate scanning direction, and a density value (or sub-pixel) of the subdivided pixel of a pixel of interest, which has been subdivided, is decided based upon the density value of the original pixel of interest and density values of pixels peripheral thereto. An angle of inclination of a slanted line which is the object of interpolation processing is detected, and the number of sub-pixels, which undergo a density conversion for interpolation processing, is changed in dependence upon the angle of inclination. Alternatively, the width of a slanted line which is the object of interpolation is detected, and the processing density conversion for interpolation is controlled in dependence upon the width of the slanted line. As a result, it is possible to obtain an image in which contour smoothing of the slanted lines of a character image is performed more effectively, with no missing black lines.

14 Claims, 46 Drawing Sheets

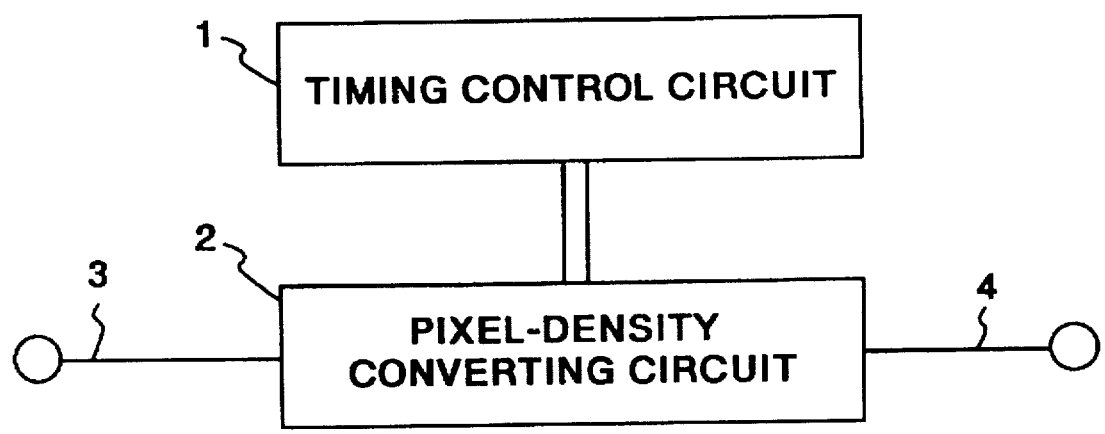
F I G. 1

$\tan\theta = 1$ $\tan\theta = 1/2$ $\tan\theta = 2$ tanθ = 1 tanθ = 1/2 tanθ = 2

$\tan\theta = 1$ $\tan\theta = 1/2$ $\tan\theta = 2$

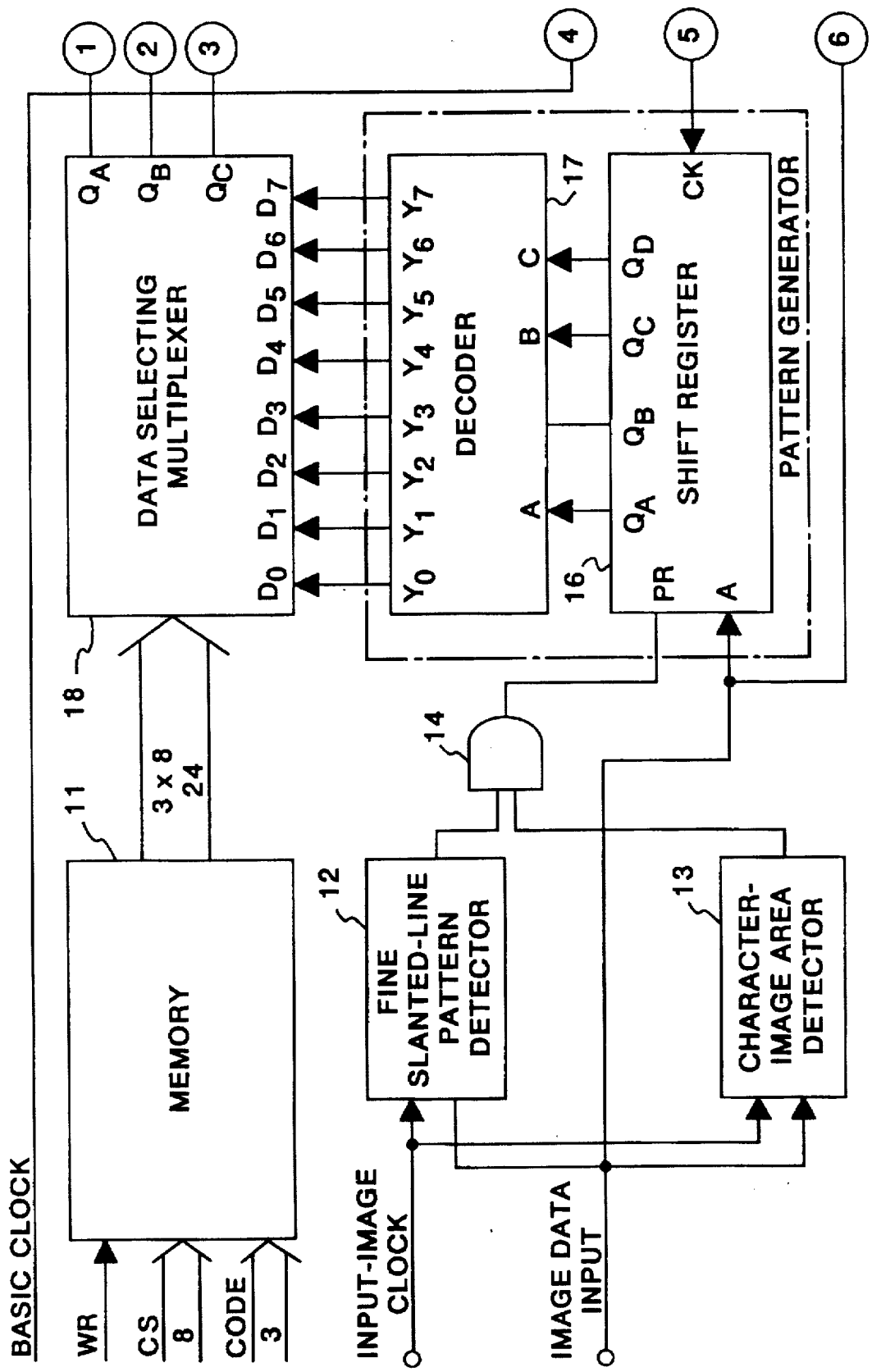
F I G. 14

| PATTERN | 1 | 2 | 3 | 4 | 5 | 6 | 7 | 8 |
|---------|---|---|---|---|---|---|---|---|
| CODE    | 5 | 4 | 4 | 2 | 4 | 4 | 4 | 2 |

F I G. 25

LOGICAL EXPRESSION OF ISOLATED-PIXEL DECISION
$ISO = (MU \cdot LM \cdot RM \cdot MD \cdot \overline{MM}) + (\overline{MU} \cdot \overline{LM} \cdot \overline{RM} \cdot \overline{MD} \cdot MM)$
FIG. 40(a)
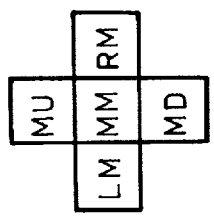
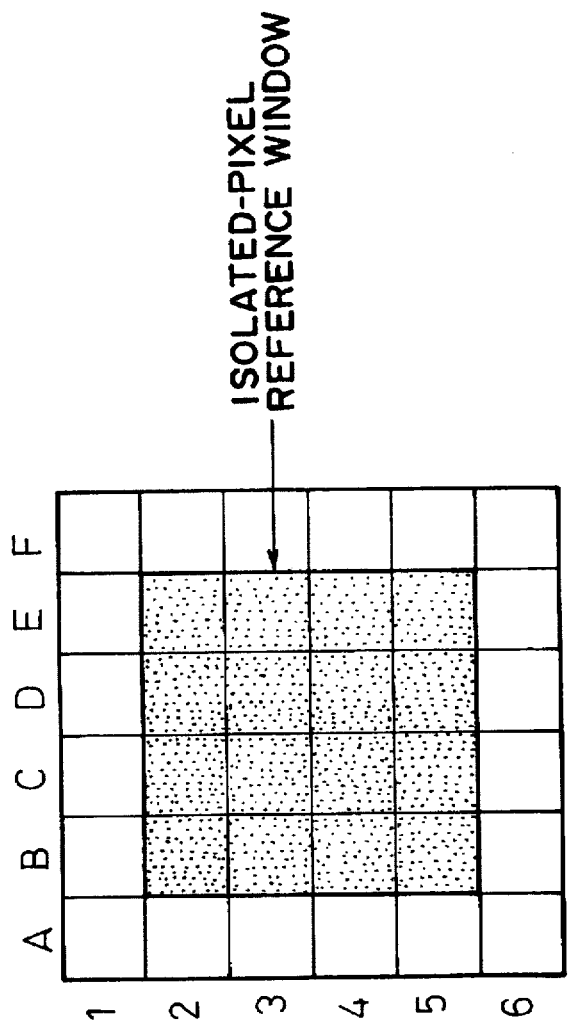
FIG. 40(b)

IMAGE PROCESSING WITH SMOOTH PRODUCTION OF INCLINED LINES AND OTHER FEATURES

This application is a continuation of application Ser. No. 07/827,984, filed Jan. 29, 1992, now abandoned.

BACKGROUND OF THE INVENTION

1. Field of the Invention

This invention relates to an image processing method and apparatus and, more particularly, to an image processing method and apparatus for converting the pixel density of inputted binary image data into a higher pixel density and outputting the higher pixel density.

2. Description of the Prior Art

In a case where interpolation is performed upon raising the density of an original binary image, an example of a pixel-density converting method that has been proposed involves subdividing a pixel of interest, and deciding the density of the resulting finely subdivided pixels (hereinafter sometimes referred to as "sub-pixels") by the pixel of interest and the pattern of the pixels peripheral to it.

Further, image processing apparatus such as copiers and facsimile machines are known as apparatus which convert pixel density and then produce an output. By way of example, in a case where 200 dpi (dots per inch) recorded data is printed by a printer having a 400 dpi dot recording density in an apparatus of the above-described kind, the arrangement is such that one dot is merely enlarged four times by repetitive processing and then printed. Furthermore, a technique has been proposed in which the actual duration of printing of a pixel of interest is controlled based on the peripheral pixel pattern in the main scanning direction, whereby the occurrence of a fogging phenomenon due to joining of neighboring dots in a laser-beam printer or the like is suppressed to improve the image quality.

In an image processing apparatus such as a facsimile machine or copier, a technique has been proposed in which, when inputted binary image data of a low resolution is outputted to an output unit having a high resolution, the original binary image is subjected to interpolation processing based on the pattern of the peripheral pixels, the contour smoothing of character images is performed with the processing for raising density, and the image is then outputted. In a case where the printing duration of a laser-beam printer or the like is outputted to a controllable output unit, another proposed technique involves controlling the printing duration of a pixel of interest based on the peripheral pixel pattern and then outputting the same, whereby the thickening of fine lines and the deformation of individual dots is prevented.

In the prior art described above, however, when a pixel-density conversion obtained by doubling in the main scanning direction and doubling in the subordinate scanning direction is performed in a pixel pattern, only one pixel of subdivided pixels is interpolated, the continuity of slanted lines having a steep inclination and of slanted lines having a gentle inclination is poor, and difficulty is encountered in improving picture quality by the interpolating effect. In certain patterns, a problem which arises is that omissions due to the interpolating effect occur with regard to black lines formed from connected individual dots.

Though the fogging phenomenon caused by the joining of neighboring dots and a rise in the black ratio due to a difference in the beam shape are inhibited, to improve upon the tonality of pseudo-half-tone images, a problem arises in terms of character images. Specifically, as shown in FIG. 27, a slanted line represented by connected dots is broken and, as a result, the quality of character images declines.

Furthermore, when the aforementioned two pixel-density conversion processing operations are applied to the same original image in which a pseudo-half-tone image and a character image are mixed, the effect of contour smoothing by interpolation processing is cancelled by the manner of controlling the duration of printing.

SUMMARY OF THE INVENTION

Accordingly, an object of the present invention is to provide an image processing method in which, when a binary image is converted to a higher density and interpolated, more effective conversion patterns are proposed and the interpolation upon conversion to higher density is performed by a simple logic operation without using a pattern memory.

According to the present invention, the foregoing object is attained by providing an image processing method in a pixel-density converting system for raising the density of an original binary image and performing interpolation processing, comprising a first process of subdividing one original pixel into $2^n$ portions (where n is an integer) in a main scanning direction and/or $2^m$ portions (where m is an integer) in a subordinate scanning direction, and a second process of deciding a density value of a subdivided pixel of a pixel of interest, which has been subdivided by the first process, based upon a density value of the original pixel of interest and density values of pixels peripheral thereto, wherein the second process includes detecting an angle of inclination of a slanted line which is the object of interpolation processing, and varying the number of sub-pixels which undergo a density conversion for interpolation processing, in dependence upon the angle of inclination. Alternatively, the second process includes detecting the width of a slanted line which is the object of interpolation processing, and controlling, in dependence upon the width of the slanted line, the processing of density conversion for interpolation processing. As a result, it is possible to obtain an image in which contour smoothing of the slanted lines of a character image is performed more effectively, with no missing black lines.

Another object of the invention is to provide an image processing apparatus in which an image more faithful to an original image can be obtained without blackening of pseudo-half-tones and without the interruption of slanted lines represented by connected dots.

Still another object of the invention is to provide an image processing apparatus in which even fine lines can be faithfully reproduced as well as the density of a portion of only one pixel without detracting from the contour smoothing of character images and without blackening of the entire image of a pseudo-half-tone image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing a pixel-density converting apparatus according to a first embodiment of the present invention;

3

Figure 2:
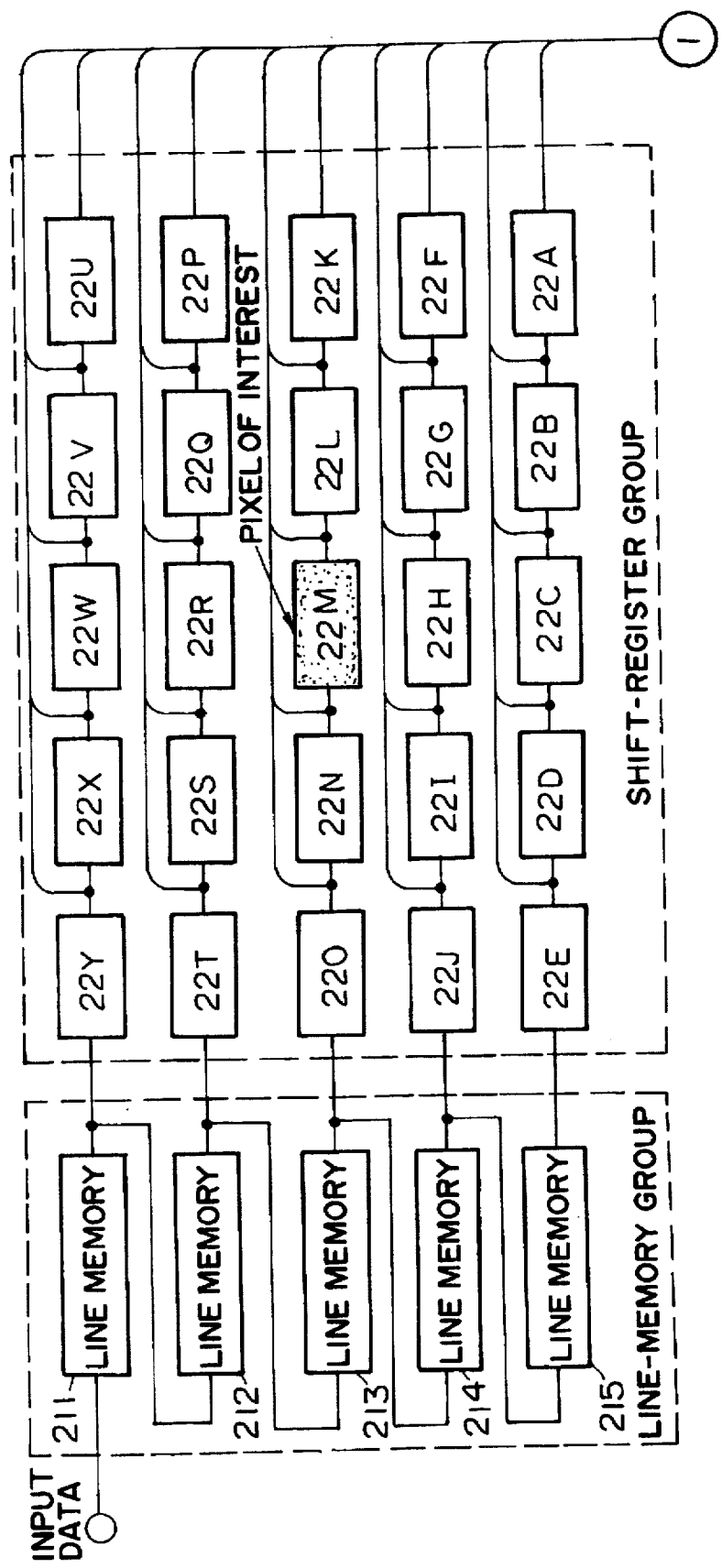
Figure 3:
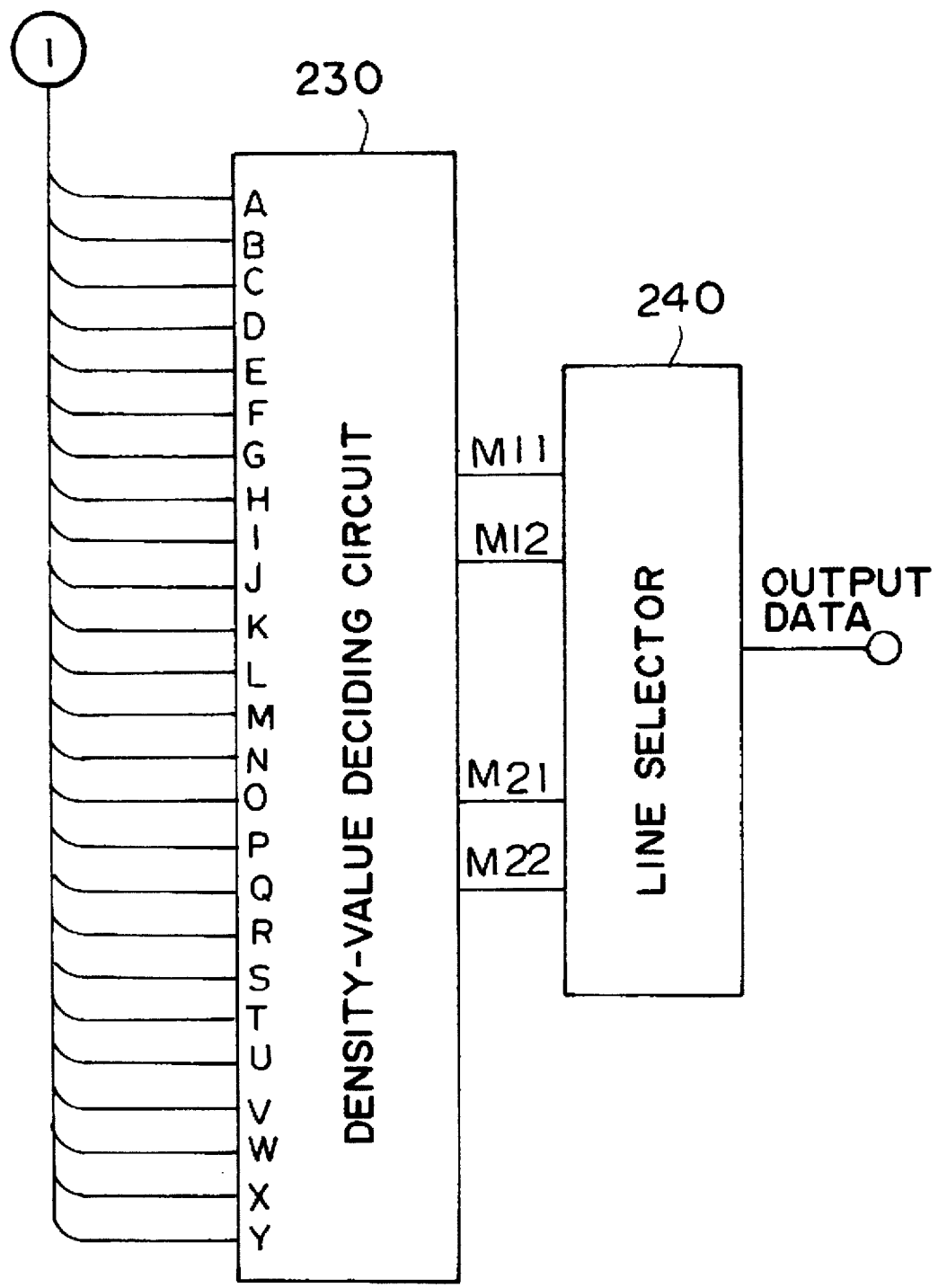
Figure 4:
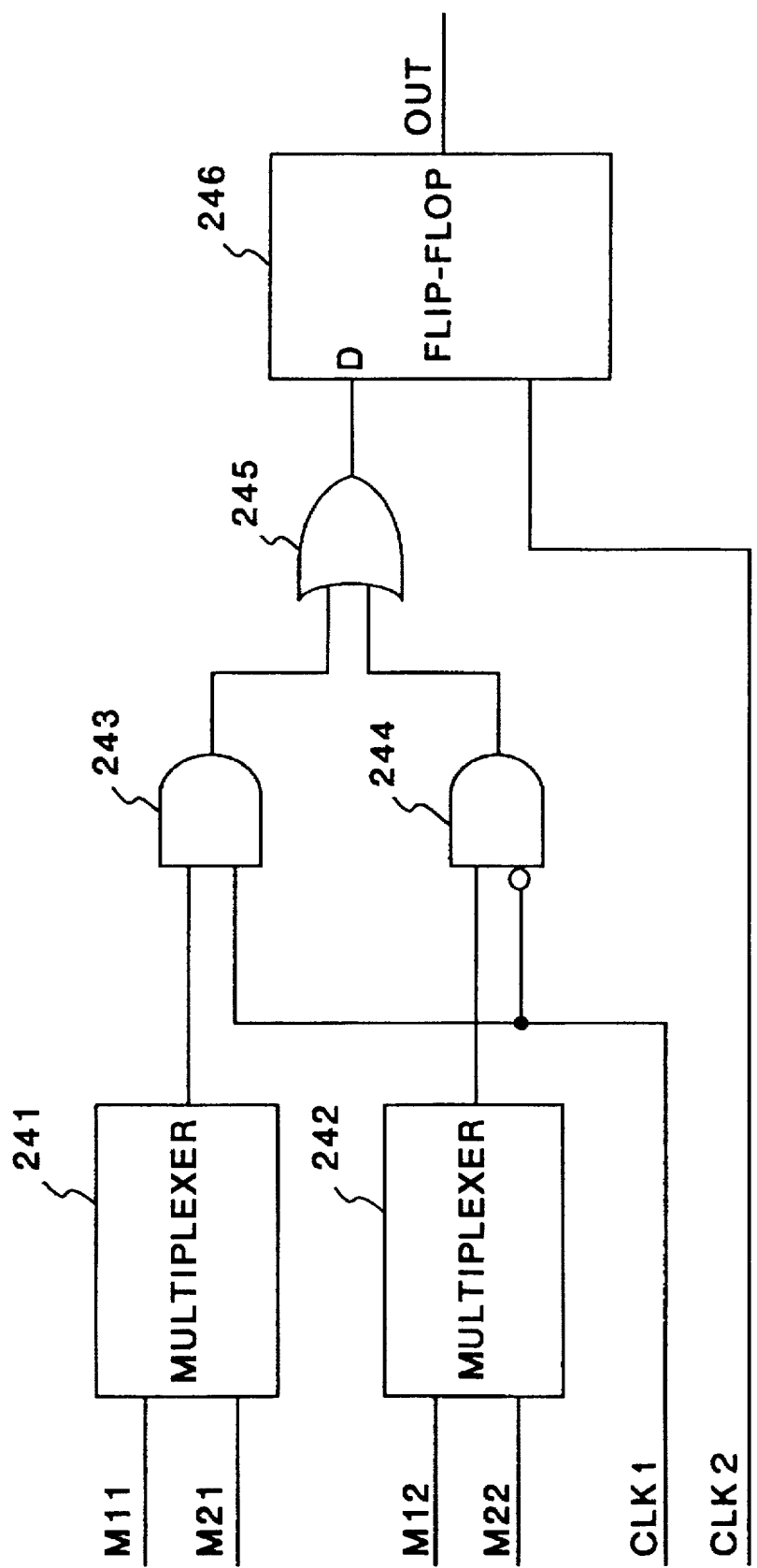
Figure 5:
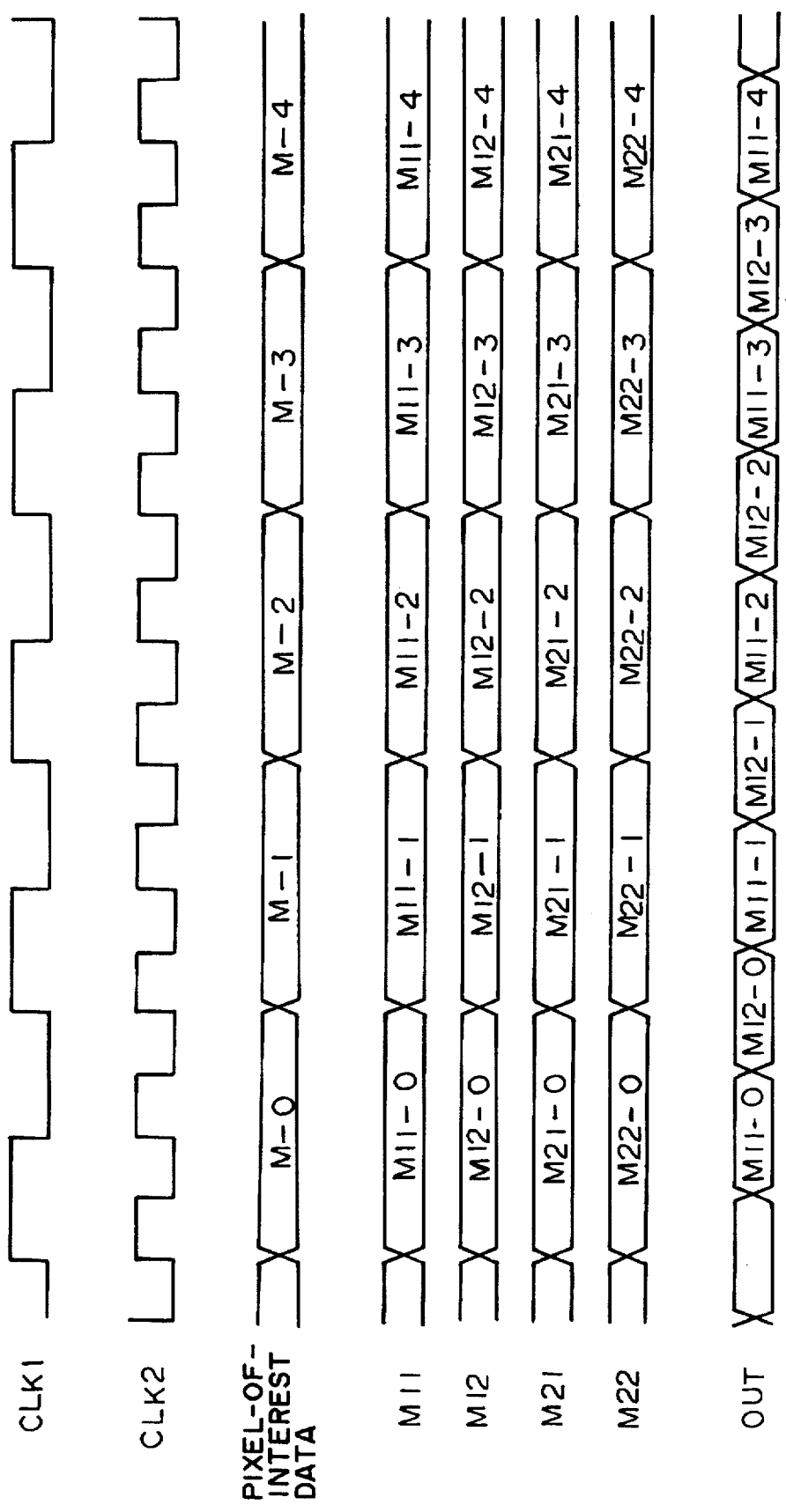
Figure 6:
Figure 7:
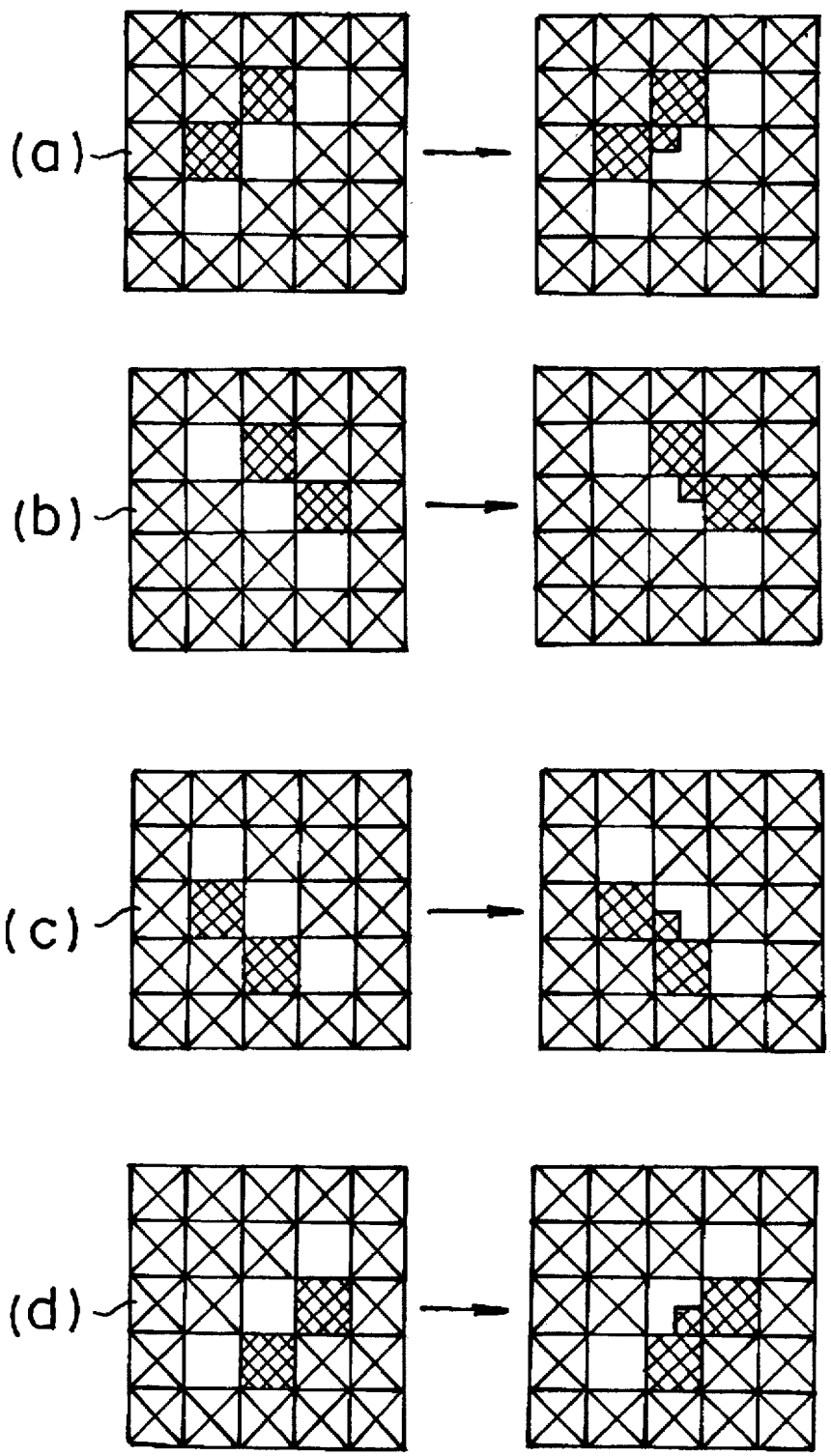
Figure 8:
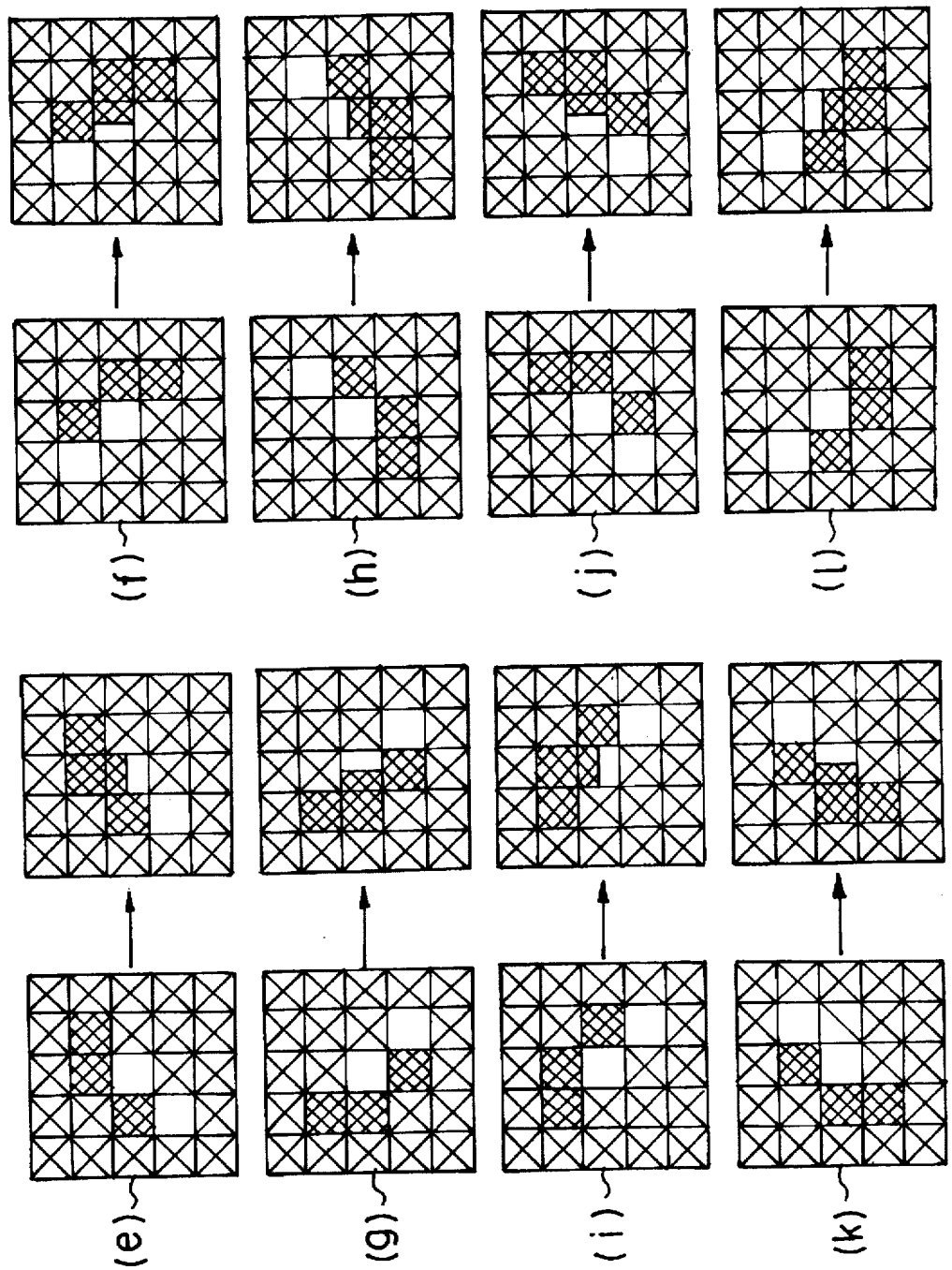
Figure 9:
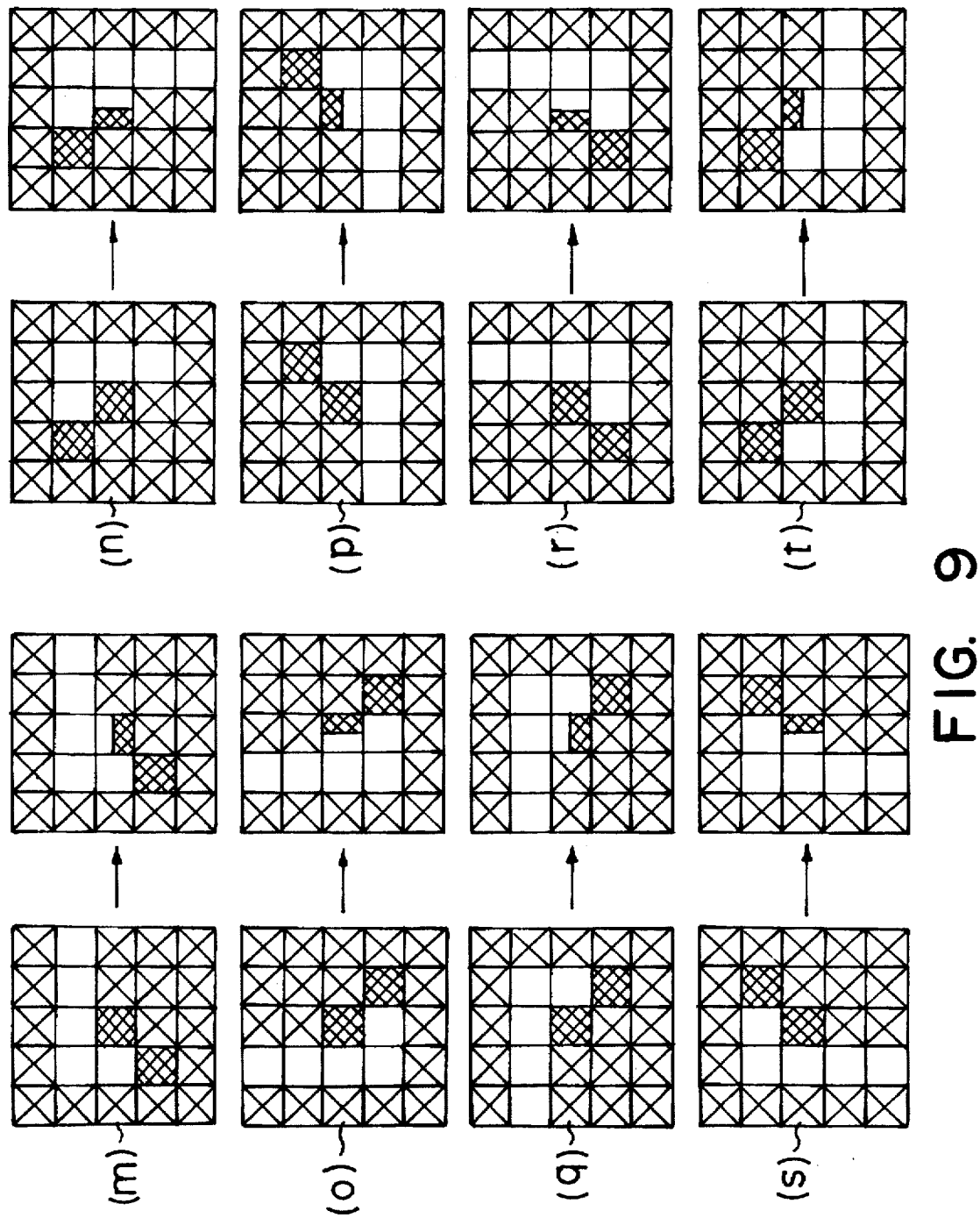
Figure 13A:
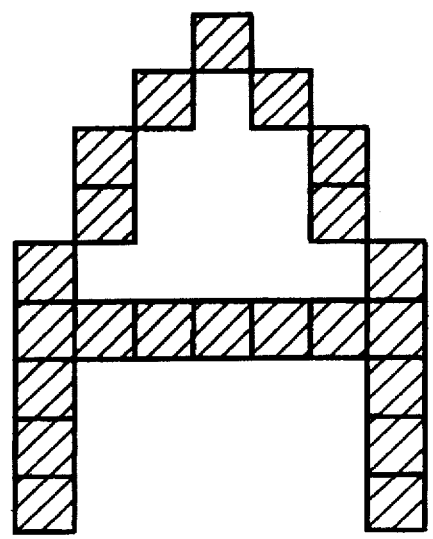
Figure 15:
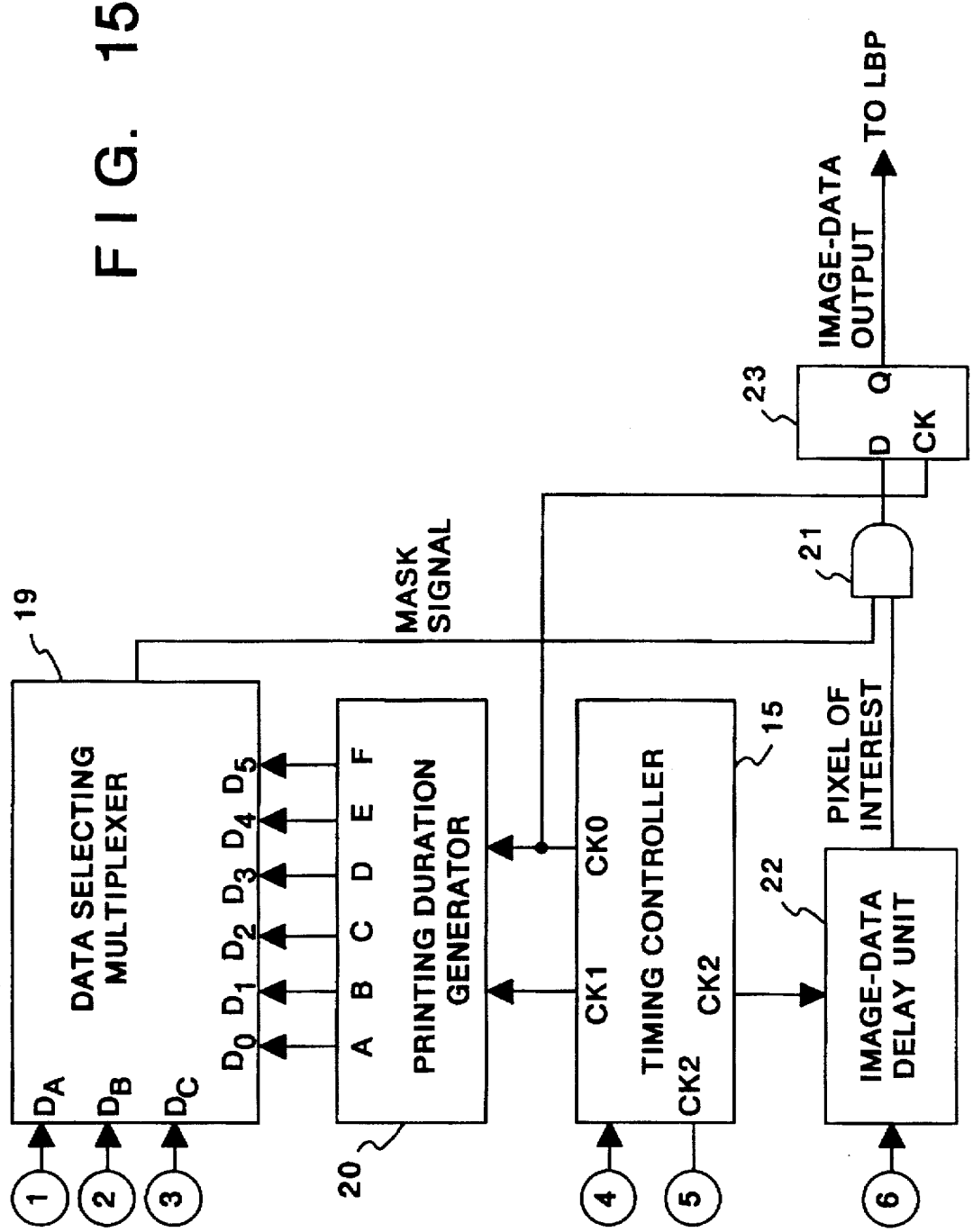
Figure 16:
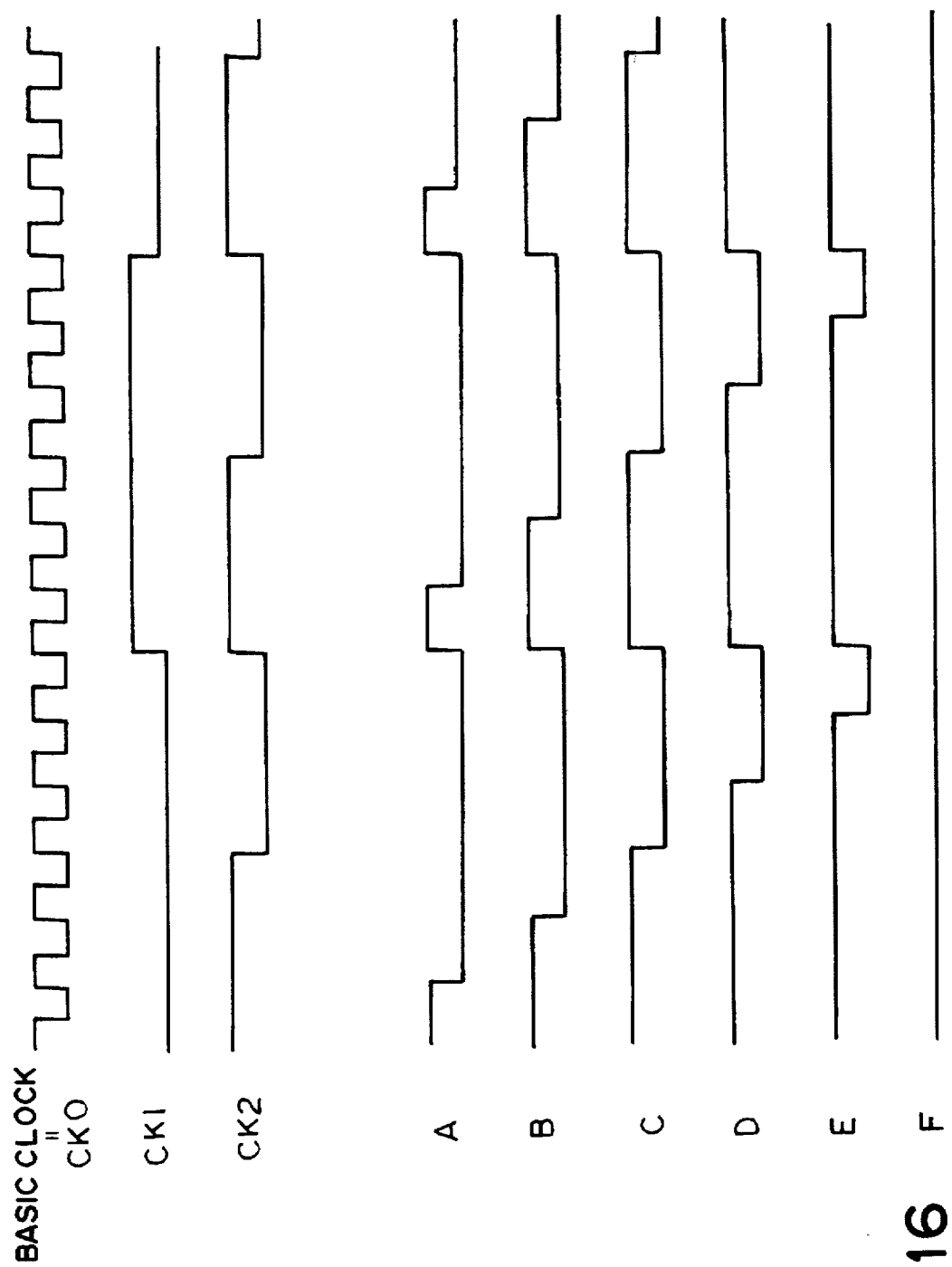
Figure 17:
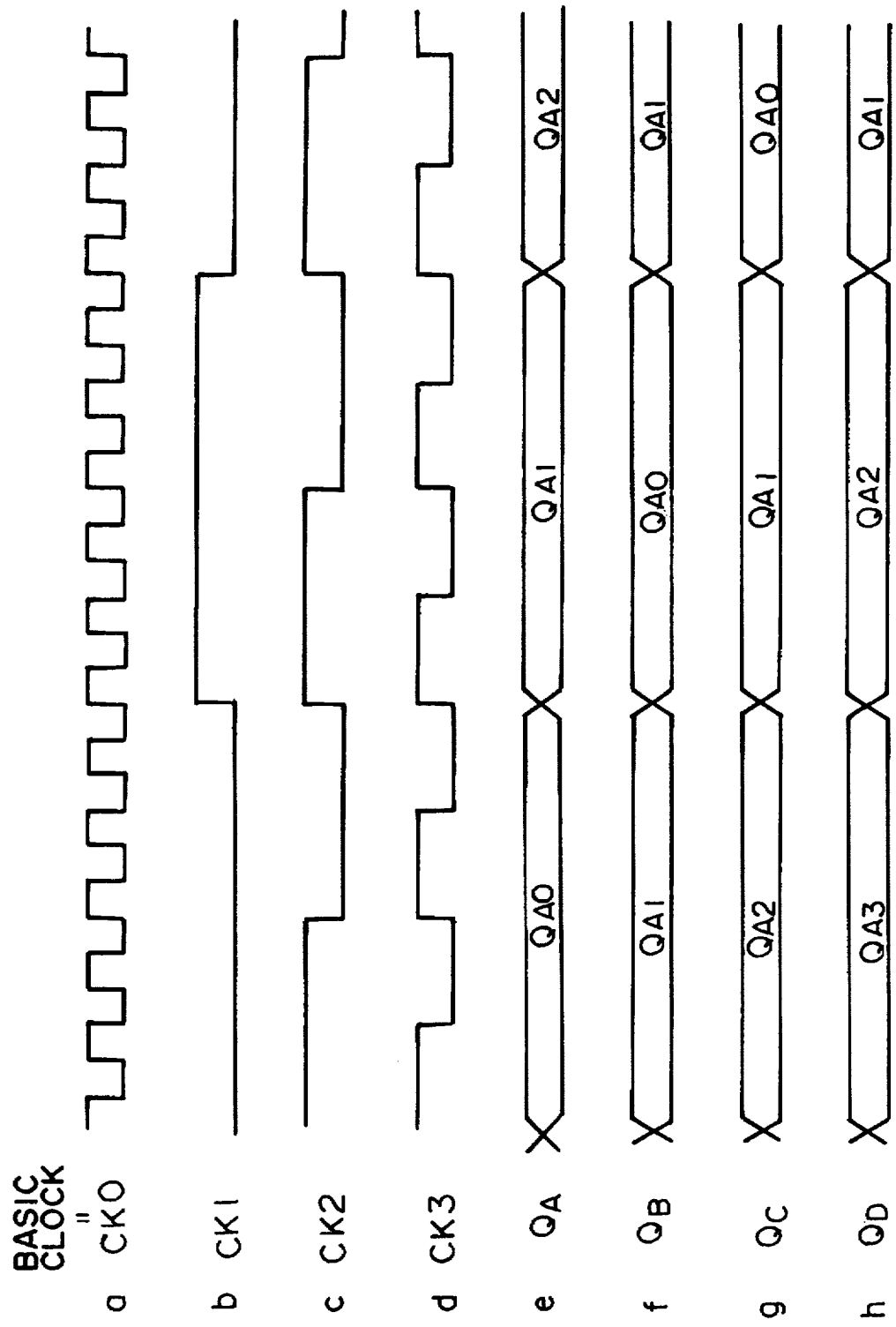
Figure 18:
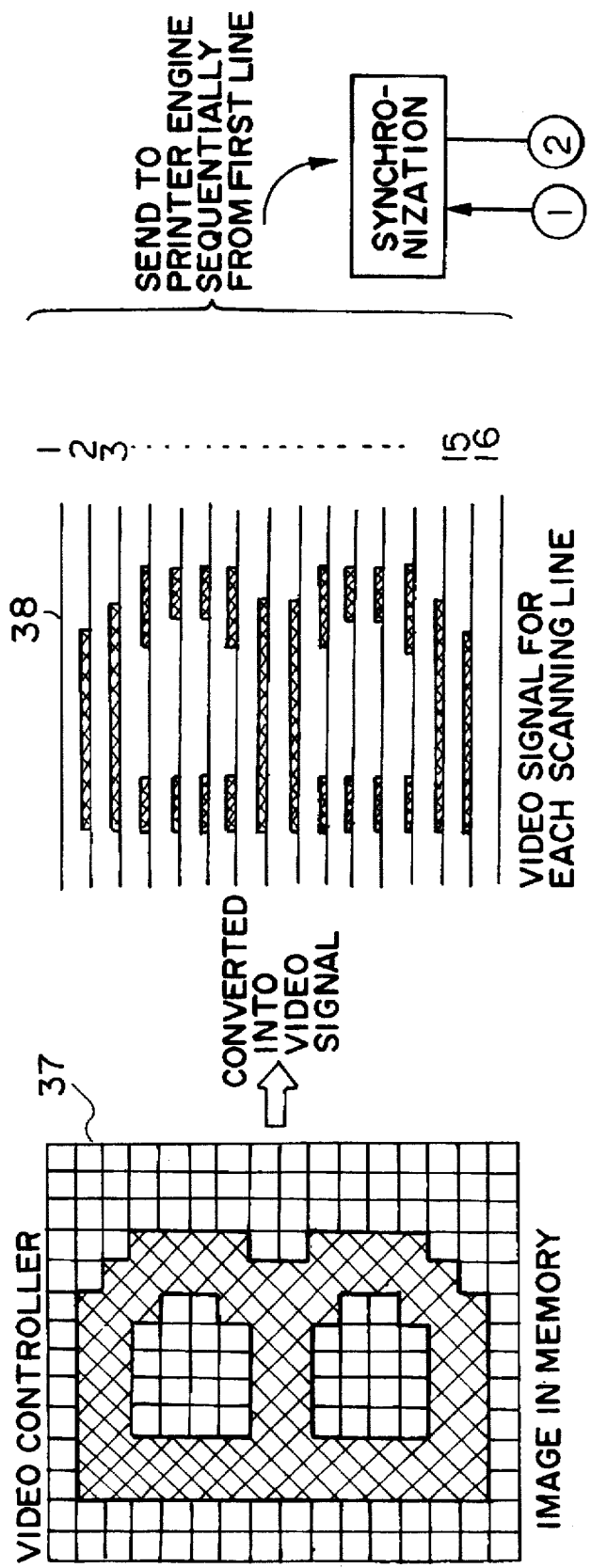
Figure 19:
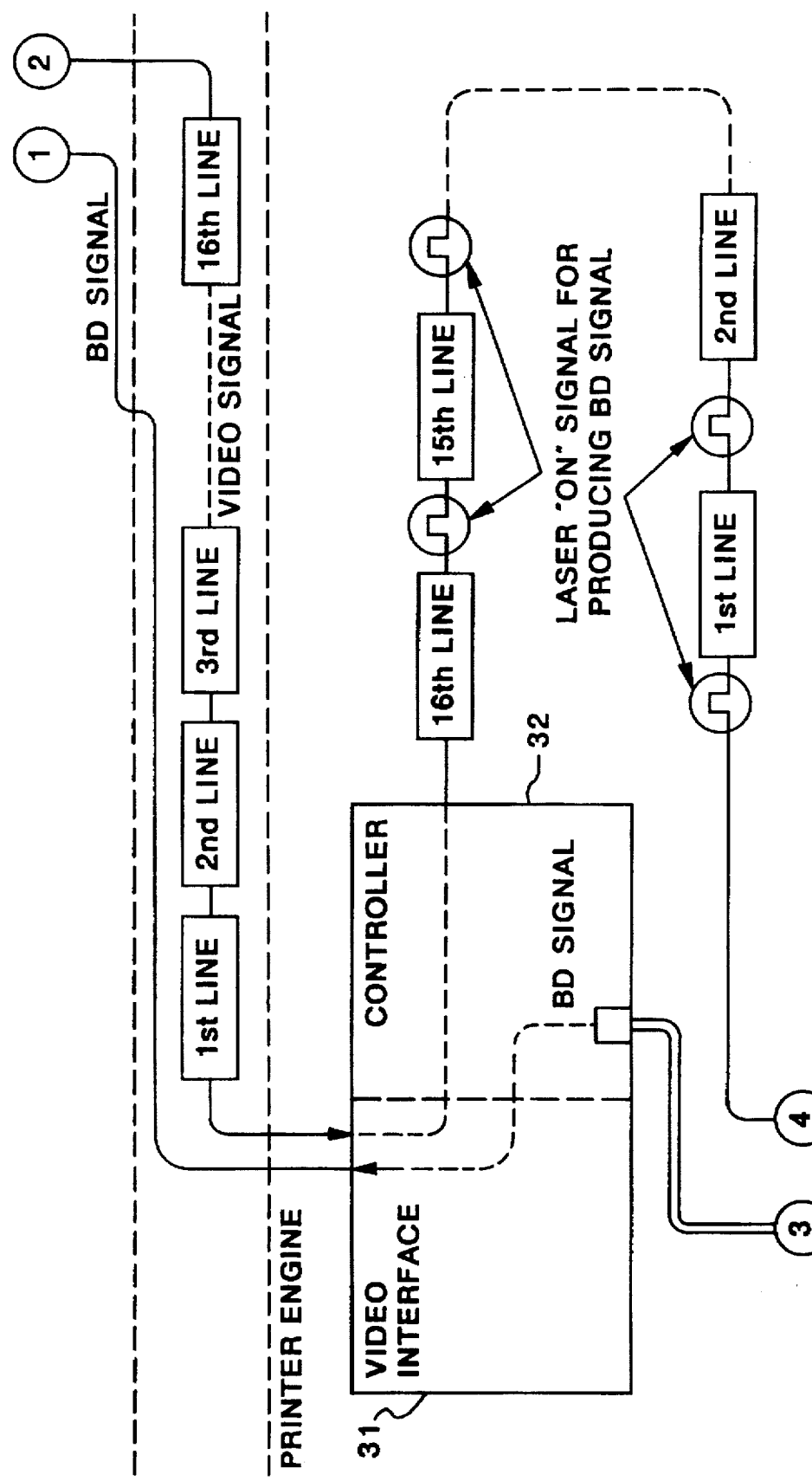
Figure 20:
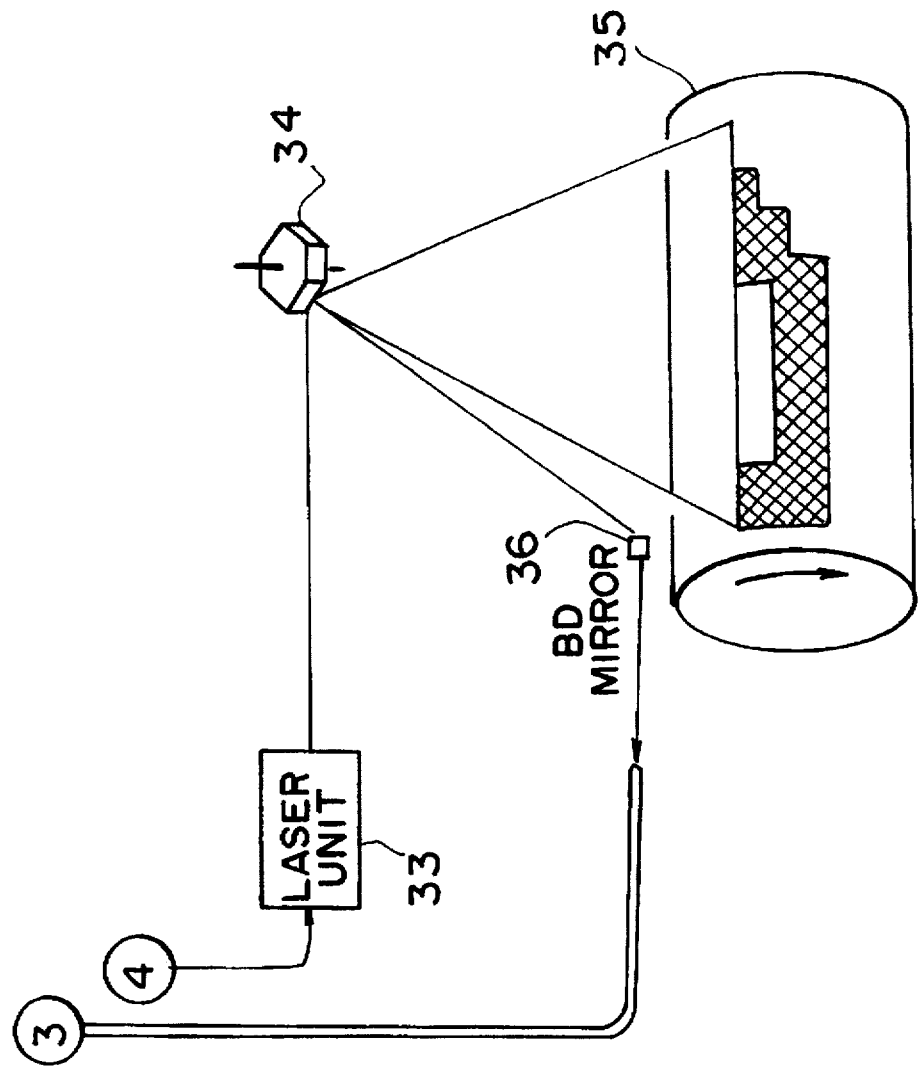
Figure 21B:
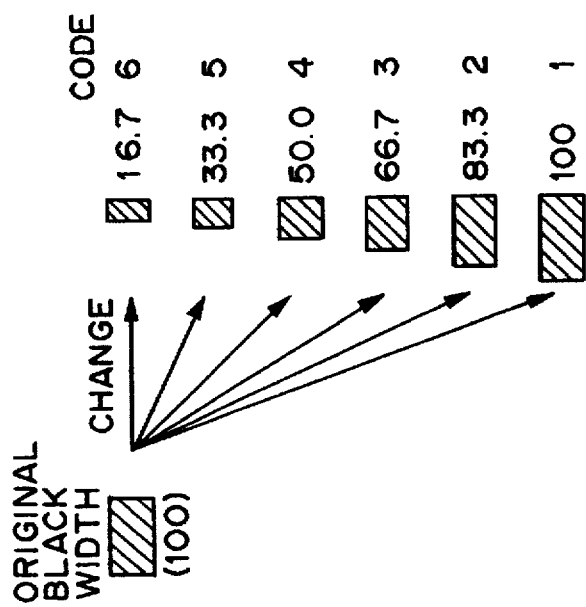
Figure 21A:
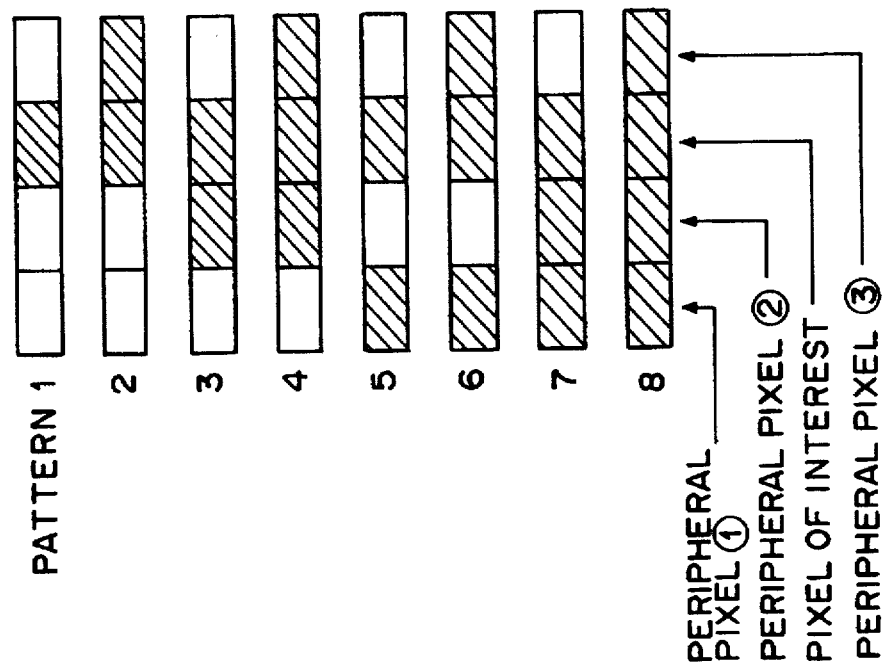
Figure 22:
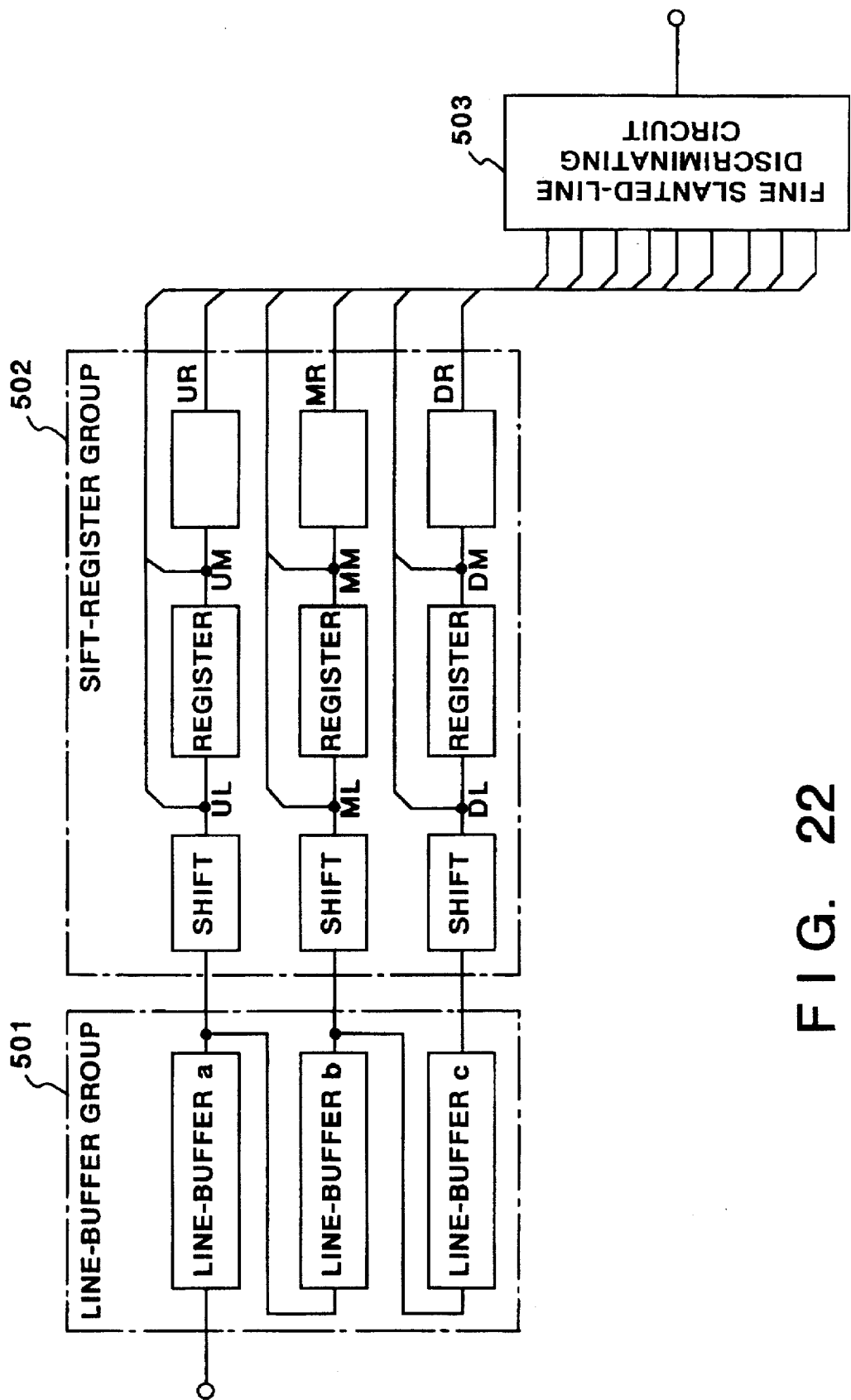
Figure 23:
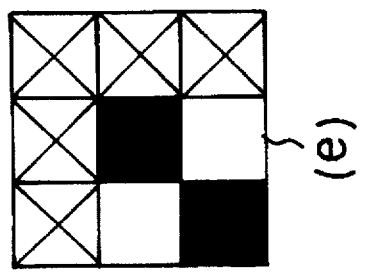
Figure 23:
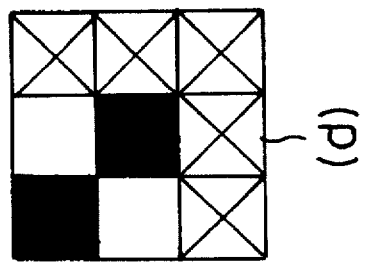
Figure 23:
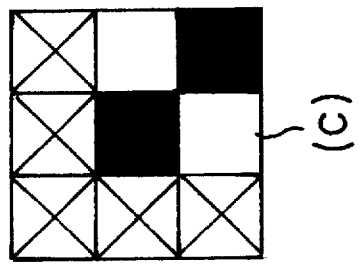
Figure 23:
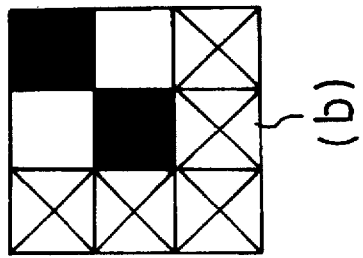
Figure 24:
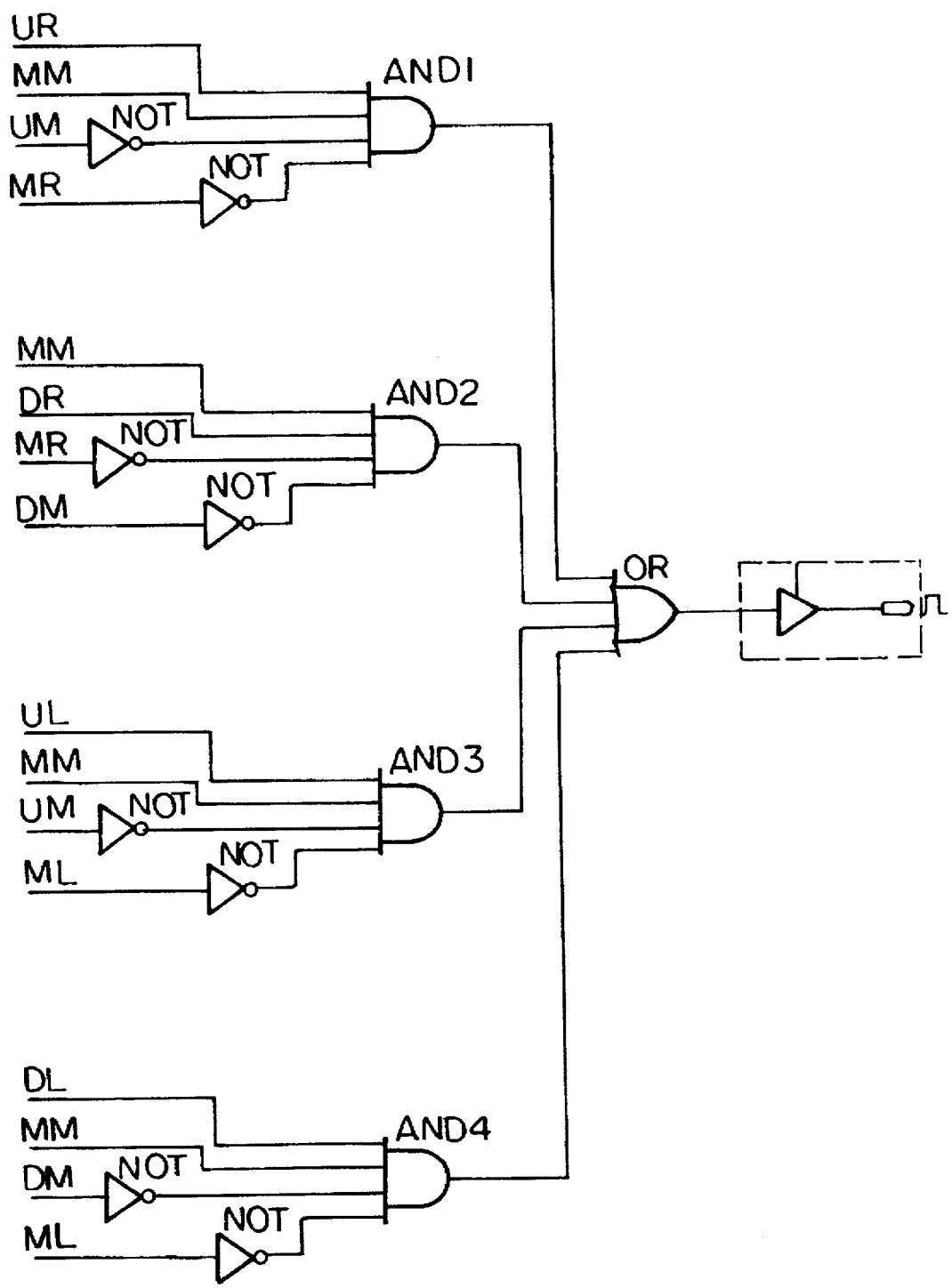
Figure 26:
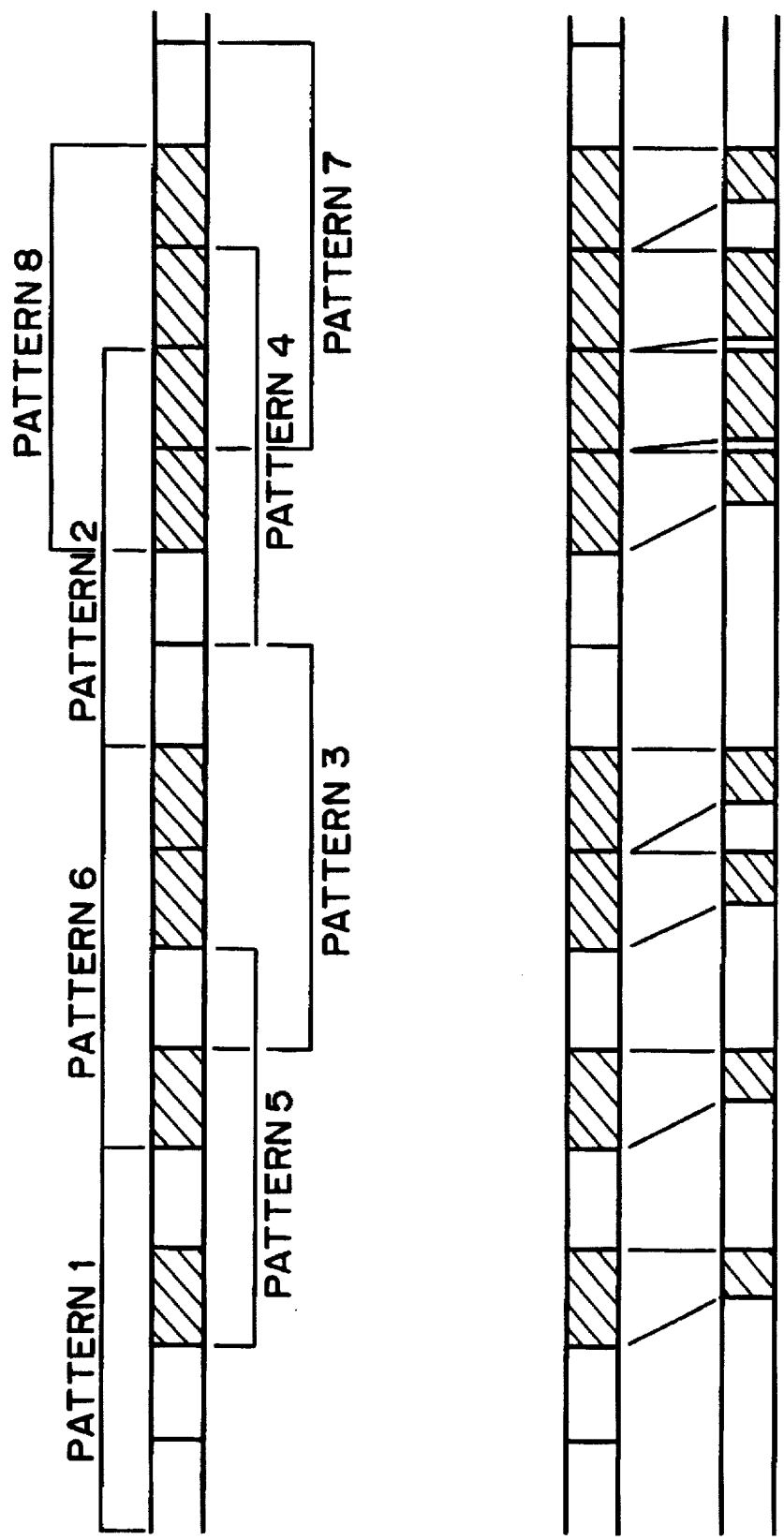
Figure 27:
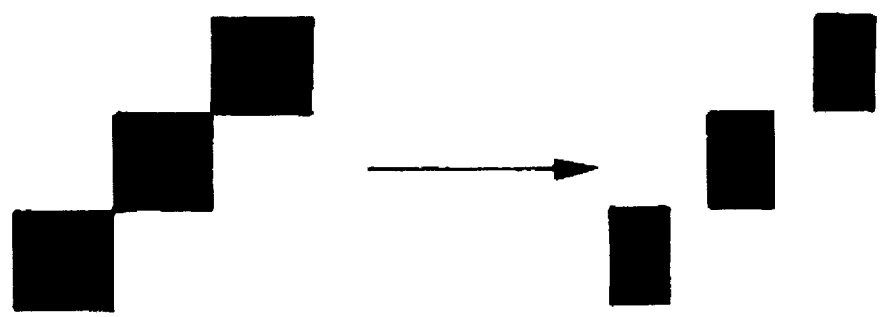
Figure 28:
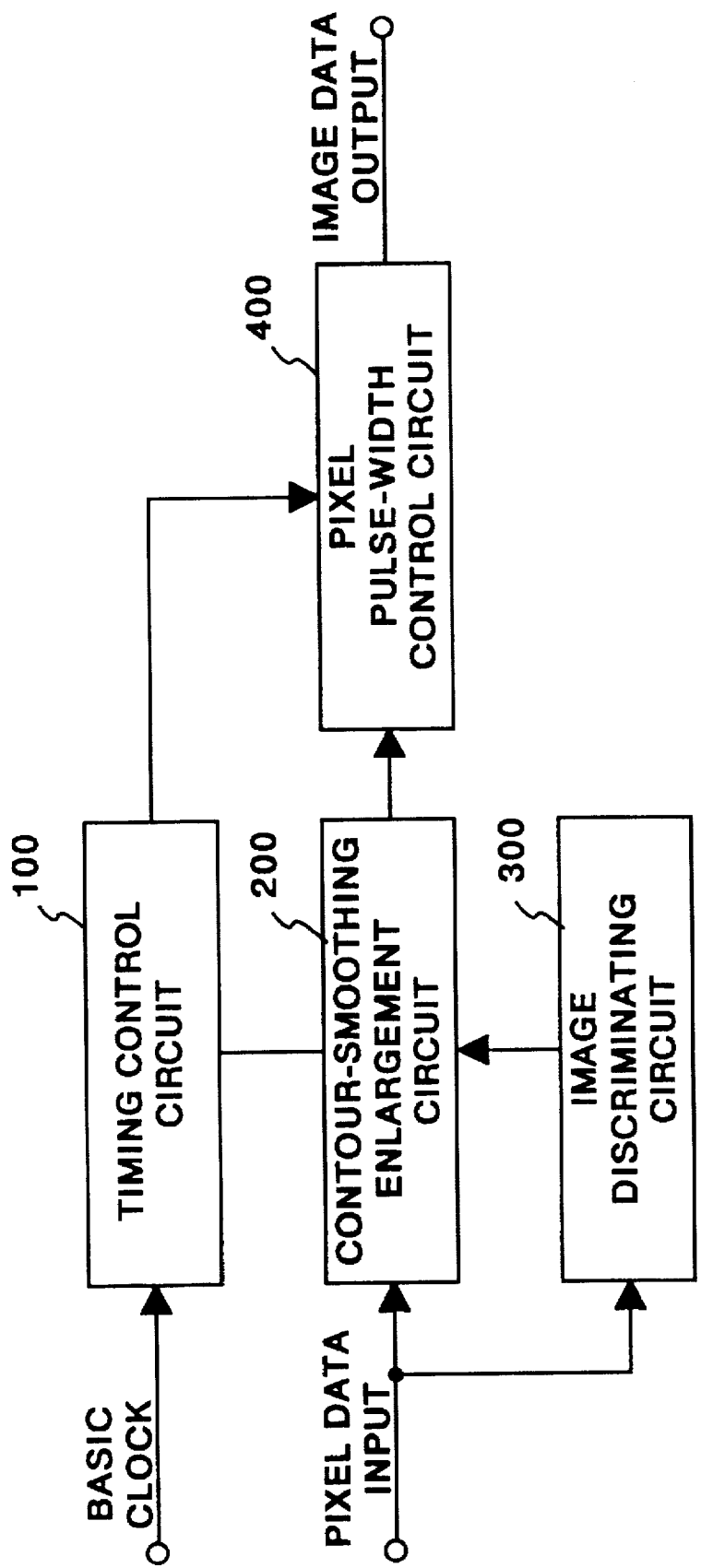
Figure 29:
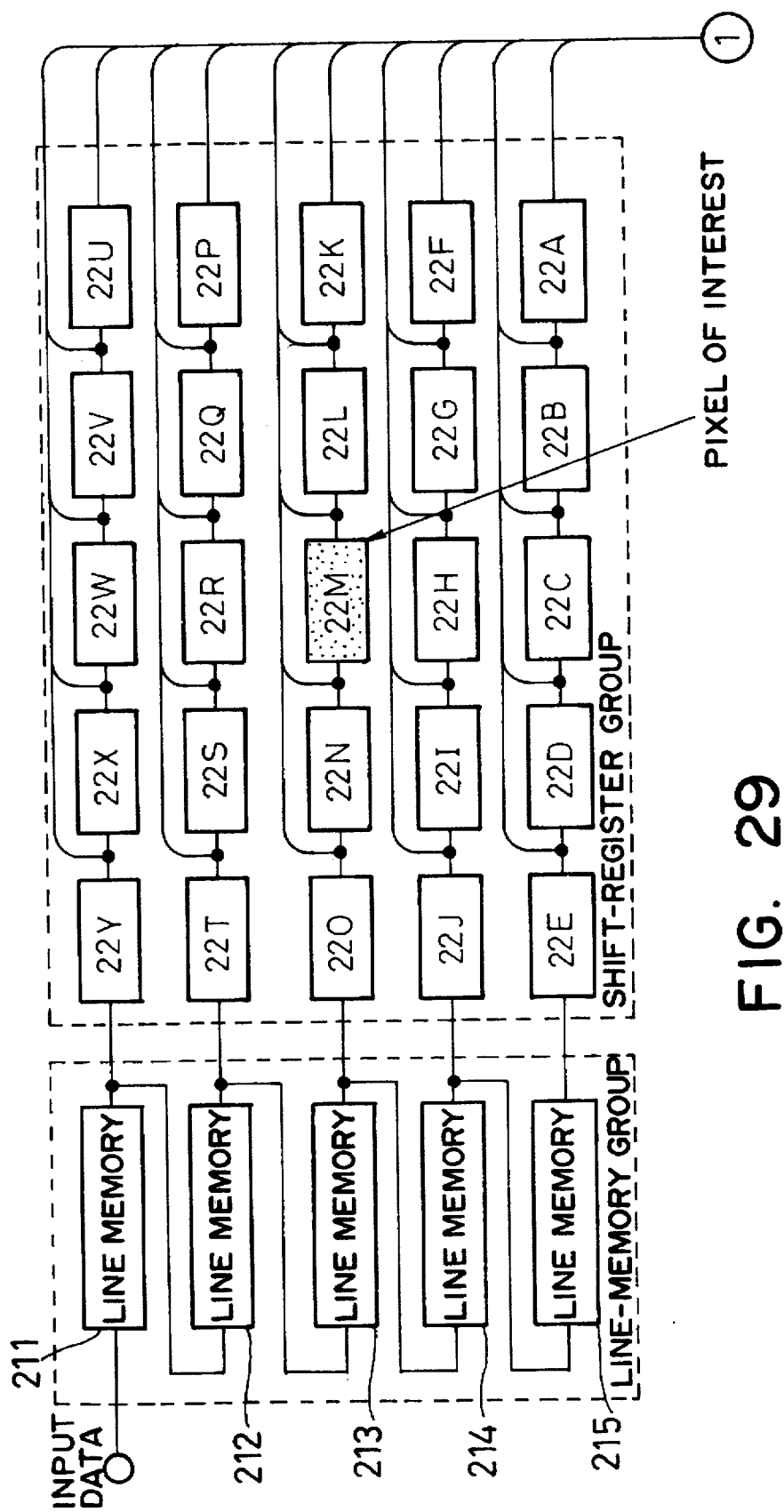
Figure 30:
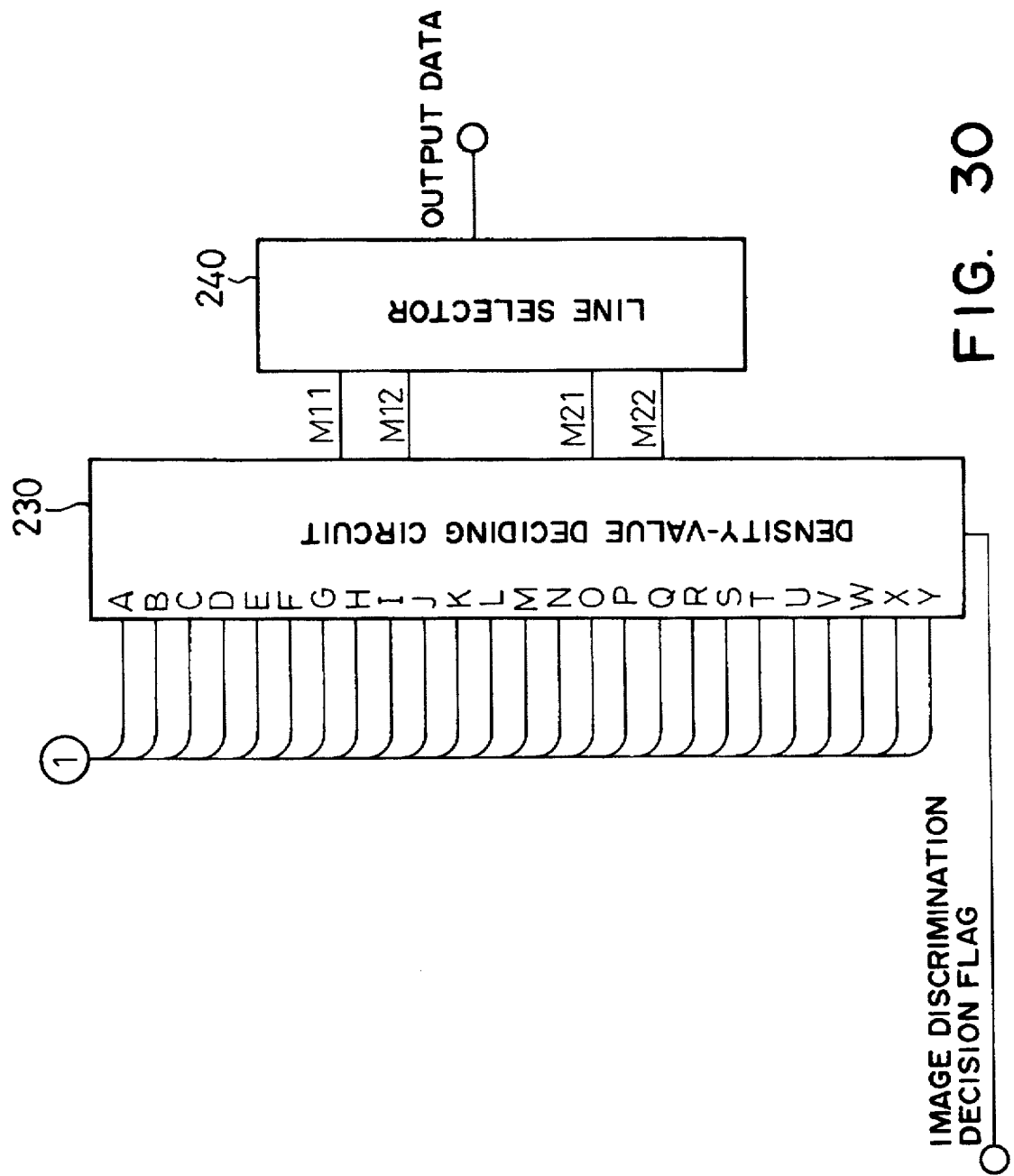
Figure 31:
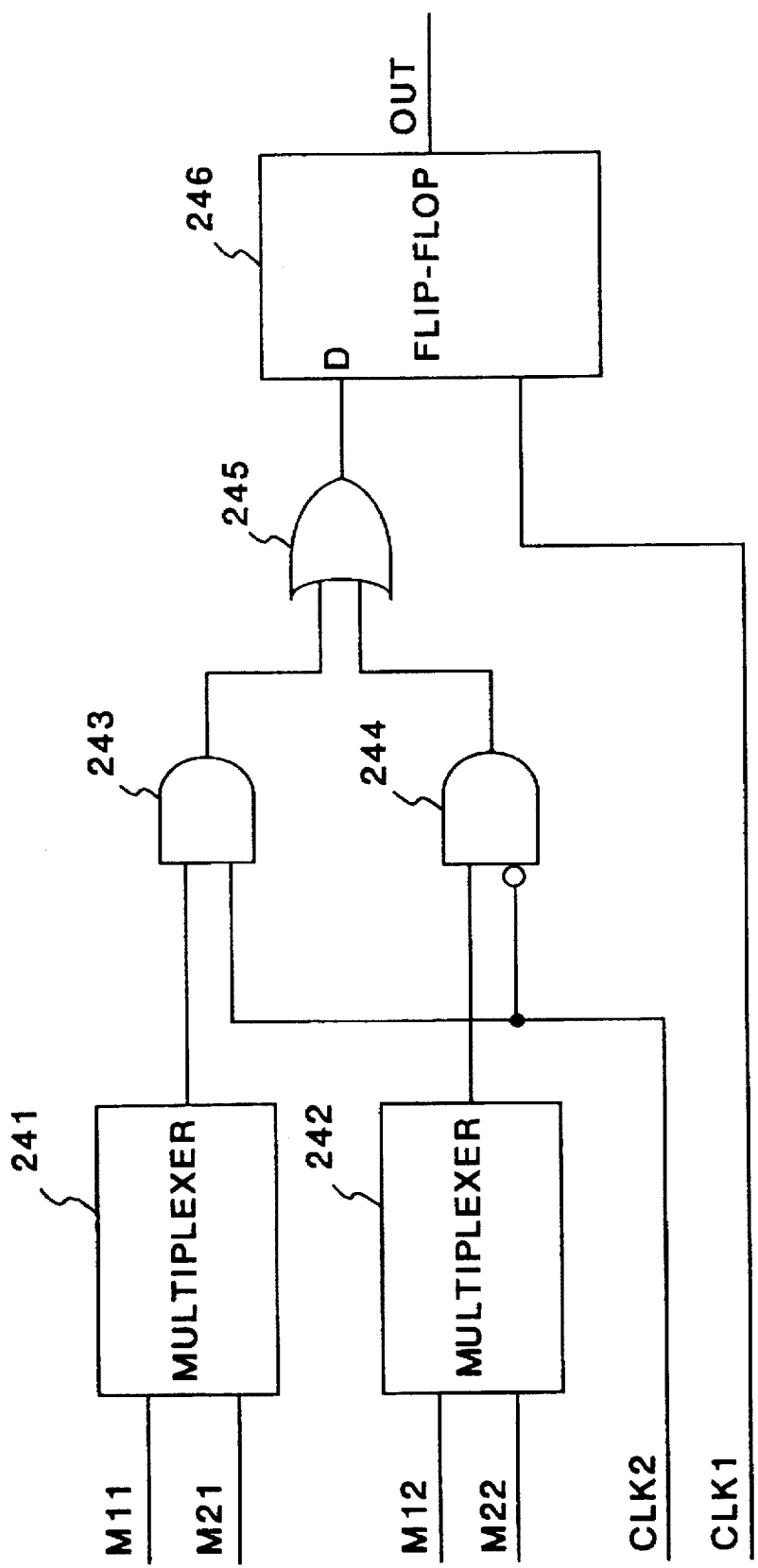
Figure 32:
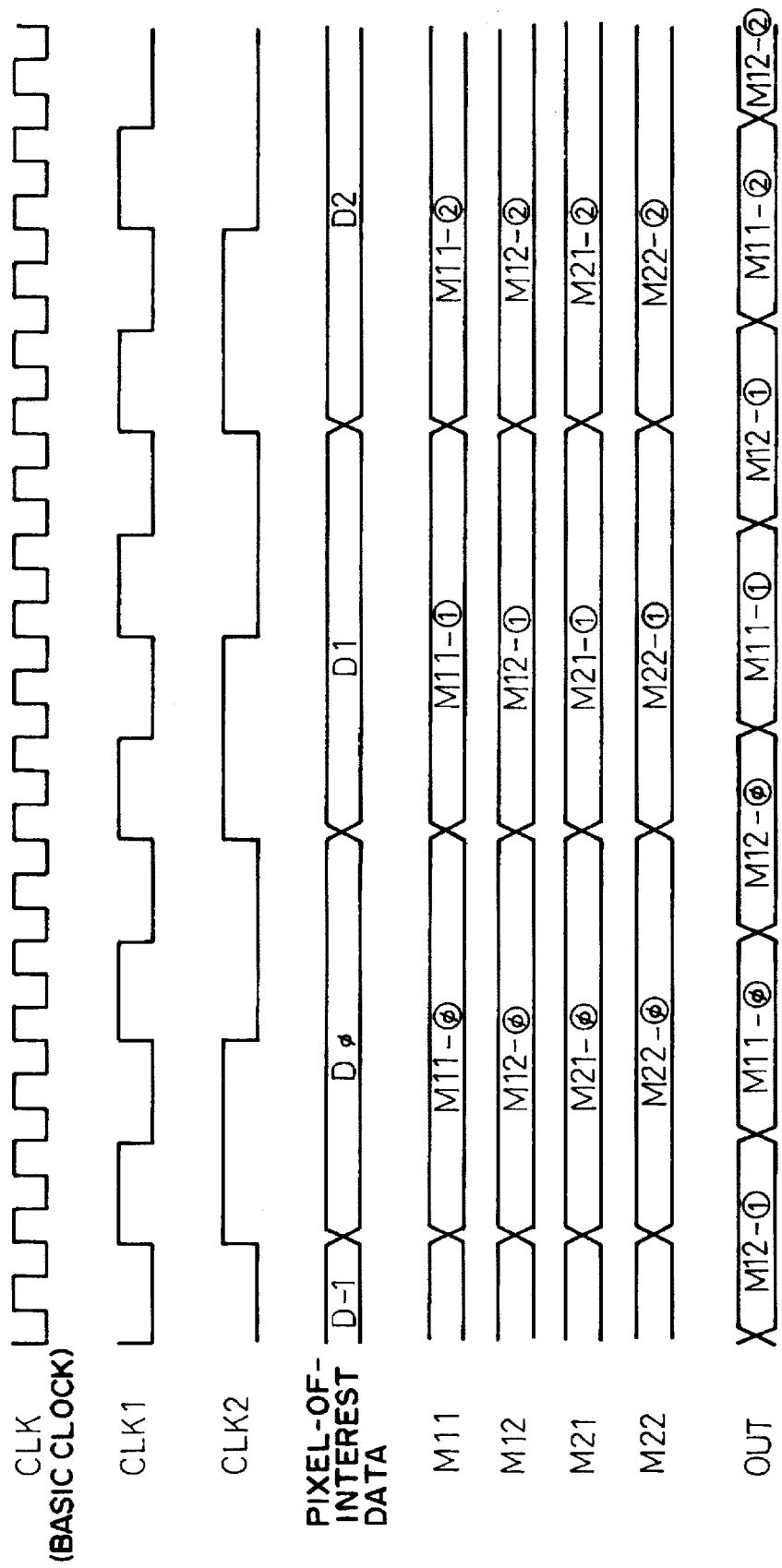
Figure 33:
Figure 34:
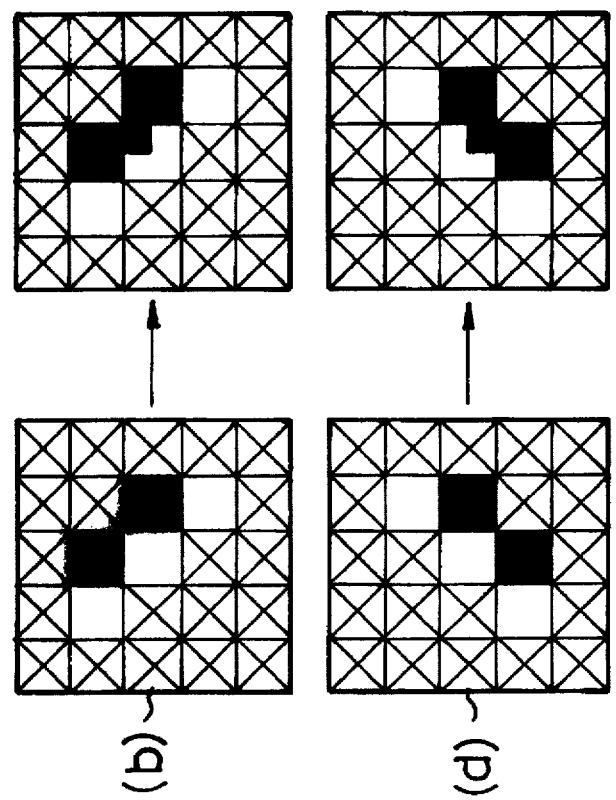
Figure 34:
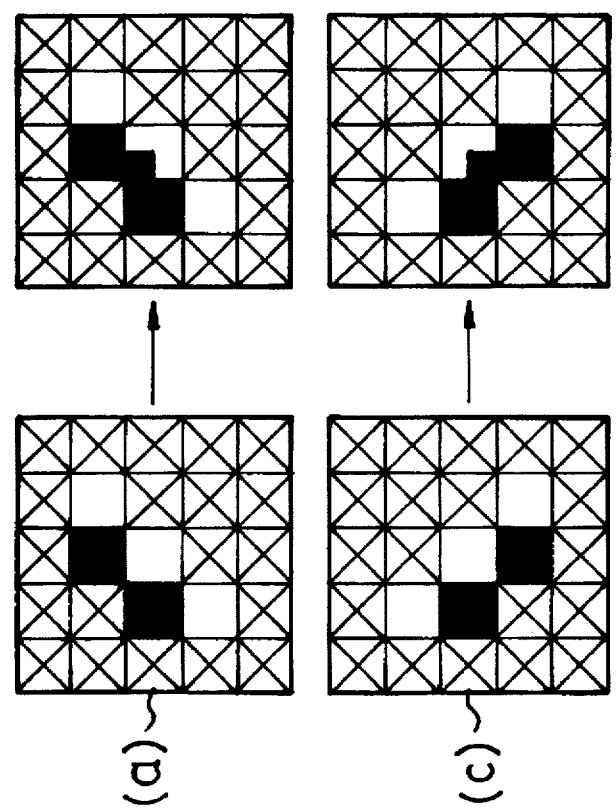
Figure 35:
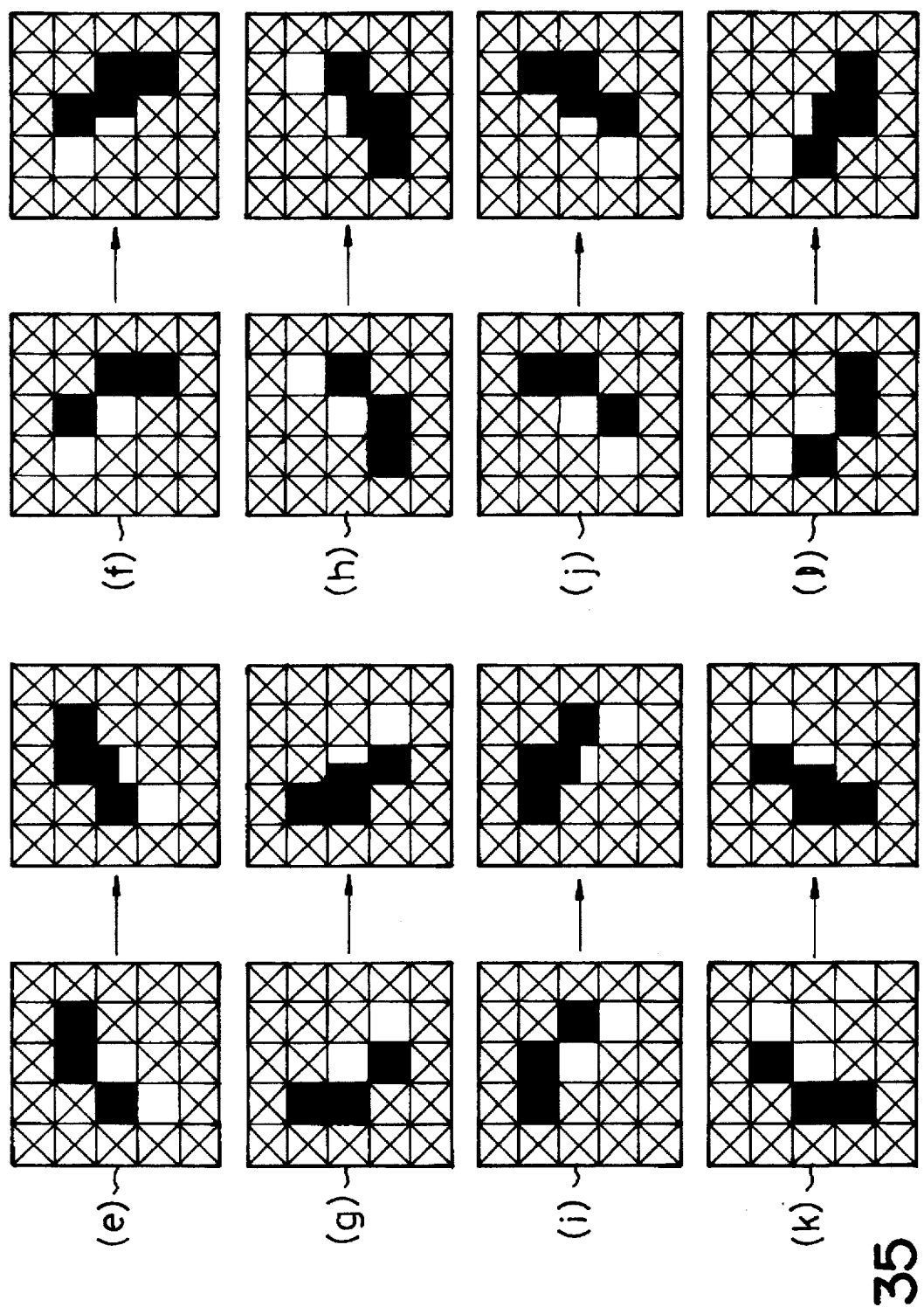
Figure 36:
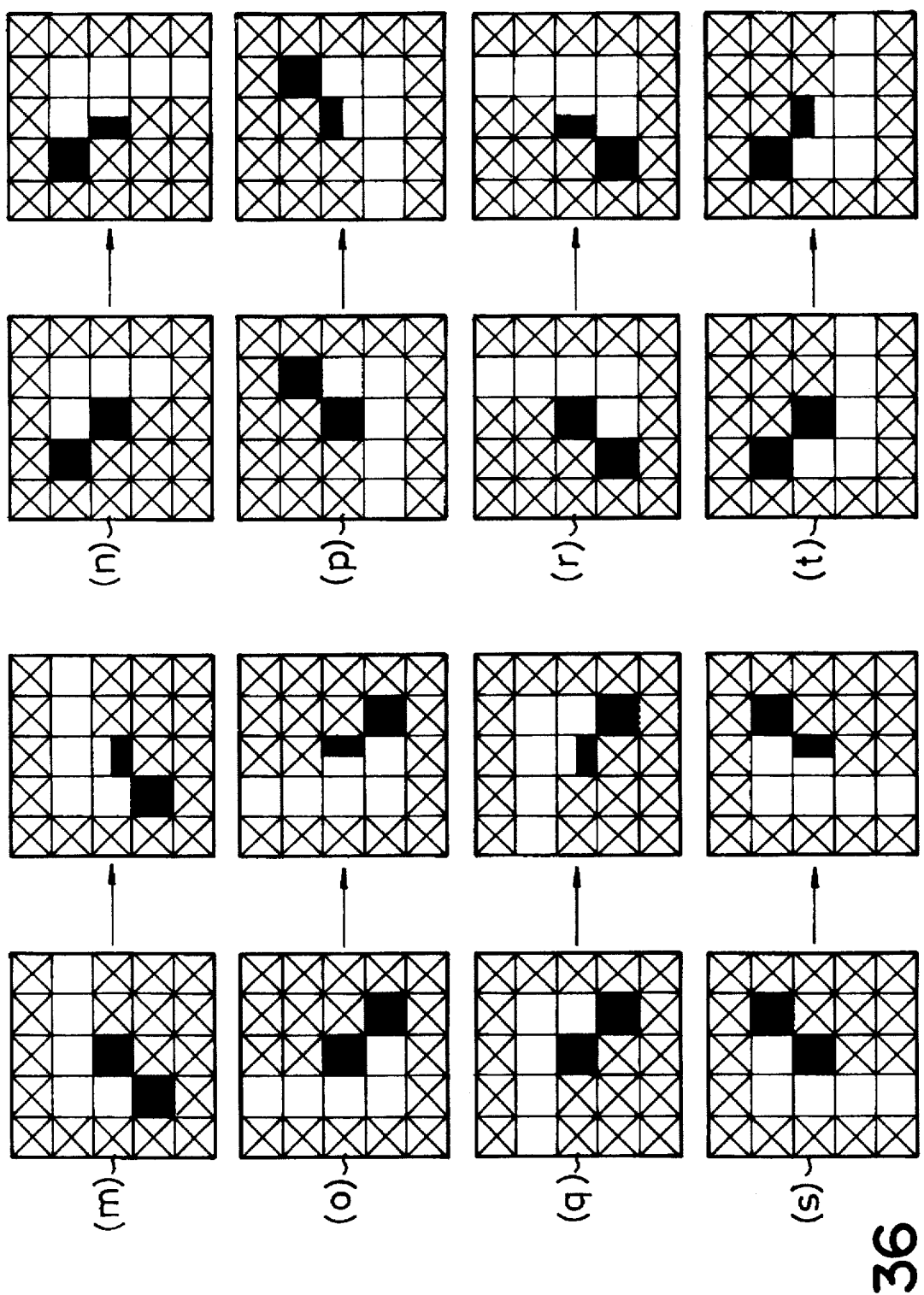
Figure 37:
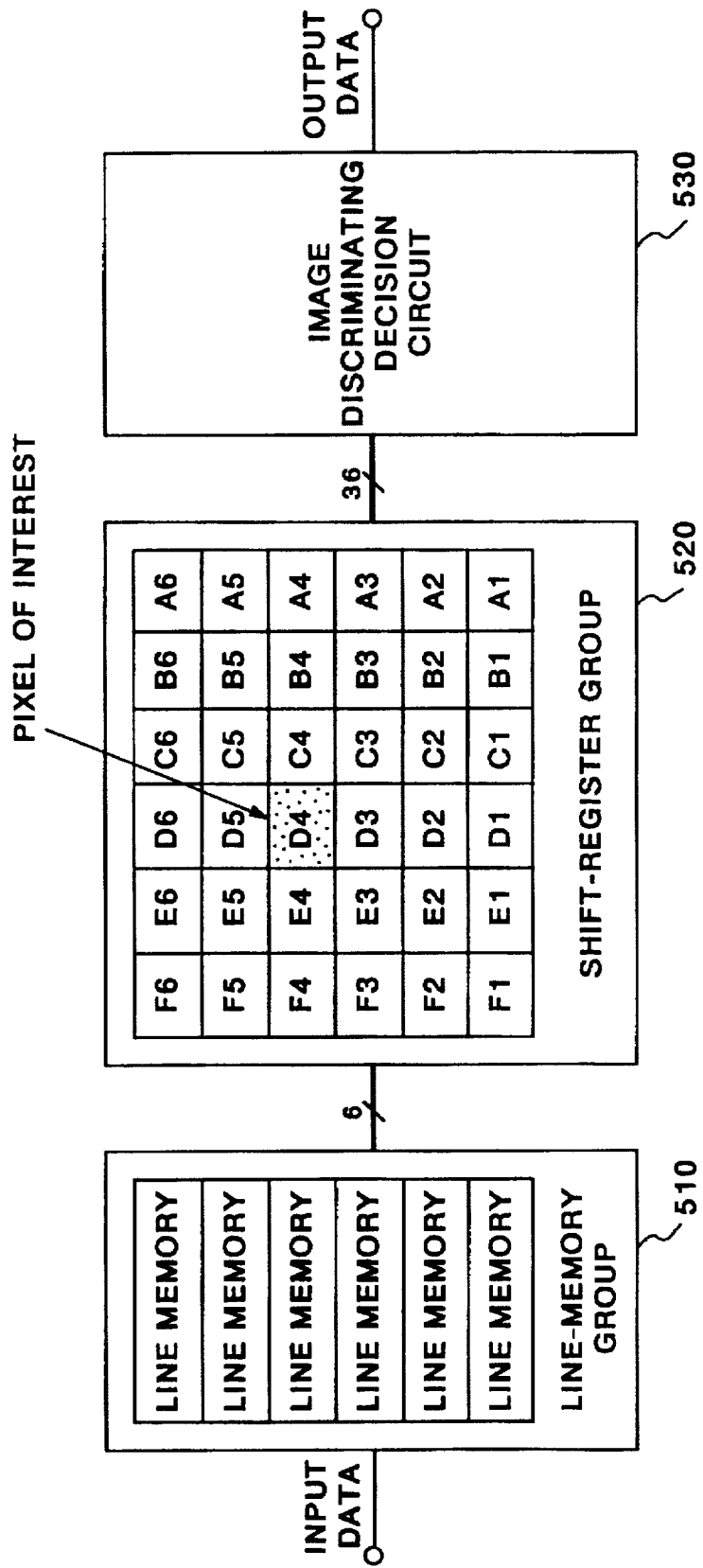

FIGS. 2 and 3 are block diagrams showing a pixel-density converting circuit according to the first embodiment;

FIG. 4 is a diagram showing the construction of a line selector depicted in FIG. 3;

FIG. 5 is a timing chart showing the output timing of a pixel-density converting circuit;

FIG. 6 is a diagram for describing conversion of pixel density;

FIGS. 7 through 9 are diagrams showing patterns for deciding the density values of subdivided pixels based upon the density values of 5×5 pixels;

FIGS. 10(a)–10(d) are diagrams illustrating examples of outputs based upon a common algorithm;

FIGS. 11(a)–11(d) are diagrams illustrating examples of outputs based upon an algorithm according to the first embodiment;

FIGS. 12(a)–12(d) are diagrams illustrating original images corresponding to FIGS. 10(a)–10(d) and 11(a)–11(d);

FIG. 13(a) is a diagram showing an original image, 13(b) a diagram showing an example of an output based upon a common algorithm, and 13(c) a diagram showing an example of an output based upon an algorithm according to the first embodiment;

FIGS. 14 and 15 are block diagrams showing the construction of the image processing apparatus according to the second embodiment;

FIGS. 16 and 17 are timing charts for describing operation according to the second embodiment;

FIGS. 18–20 are conceptual views of a a laser-beam printer;

FIG. 21(a) is a diagram for describing black-and-white pixel patterns and 21(b) a diagram illustrating various printing durations, as well as the time ratios;

FIG. 22 is a diagram for describing a fine slanted-line pattern detector;

FIG. 23 is a diagram illustrating patterns for judging fine slanted lines;

FIG. 24 is a diagram for describing a fine slanted-line pattern detector;

Figure 25:
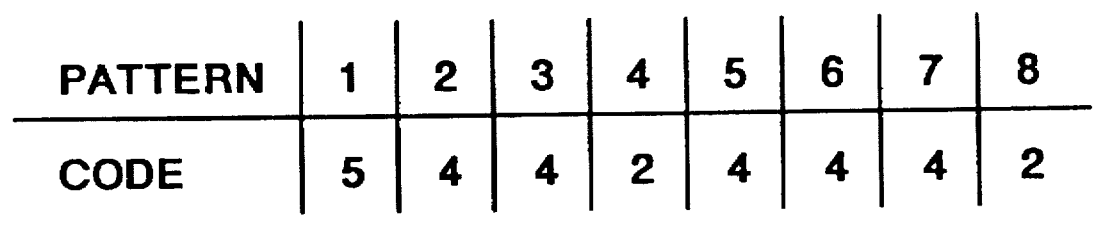

FIG. 25 is a diagram showing the setting of codes corresponding to patterns;

FIG. 26 is a diagram showing an example of pattern extraction of pixel strings and an example of output of printing durations;

FIG. 27 is a diagram showing the deterioration of an image caused by ordinary control of printing duration;

FIG. 28 is a simplified block diagram showing the construction of an image processing apparatus according to a third embodiment of the invention;

FIGS. 29 and 30 are block diagrams showing the construction of a contour-smoothing enlargement circuit according to the third embodiment;

FIG. 31 is a diagram showing the construction of a line selector in the third embodiment;

FIG. 32 is a timing chart showing the output timings of the line selector;

FIG. 33 is a diagram for describing contour-smoothing enlargement in the third embodiment;

FIGS. 34 through 36 are diagrams illustrating patterns for deciding the density values of subdivided pixels based upon the density values of 5×5 pixels;

FIG. 37 is a block diagram showing the construction of an image discriminating circuit in the third embodiment;

4

Figure 38:
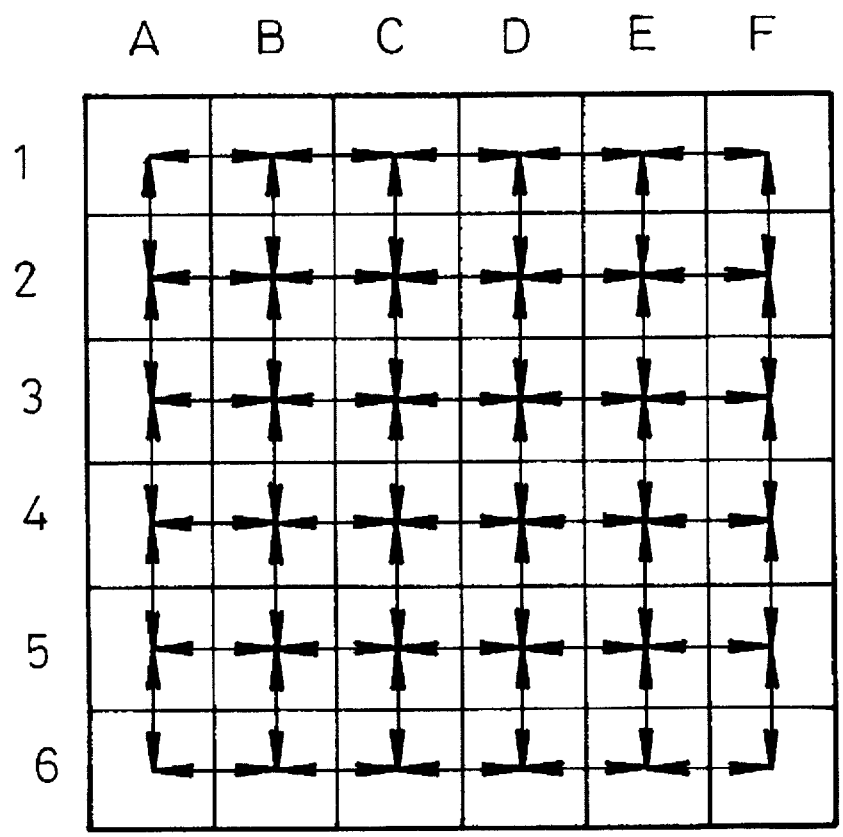
Figure 39:
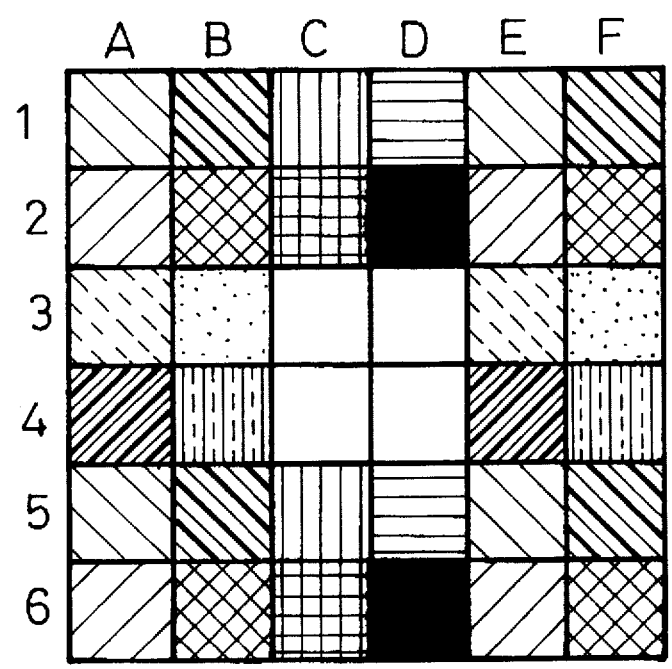
Figure 41:
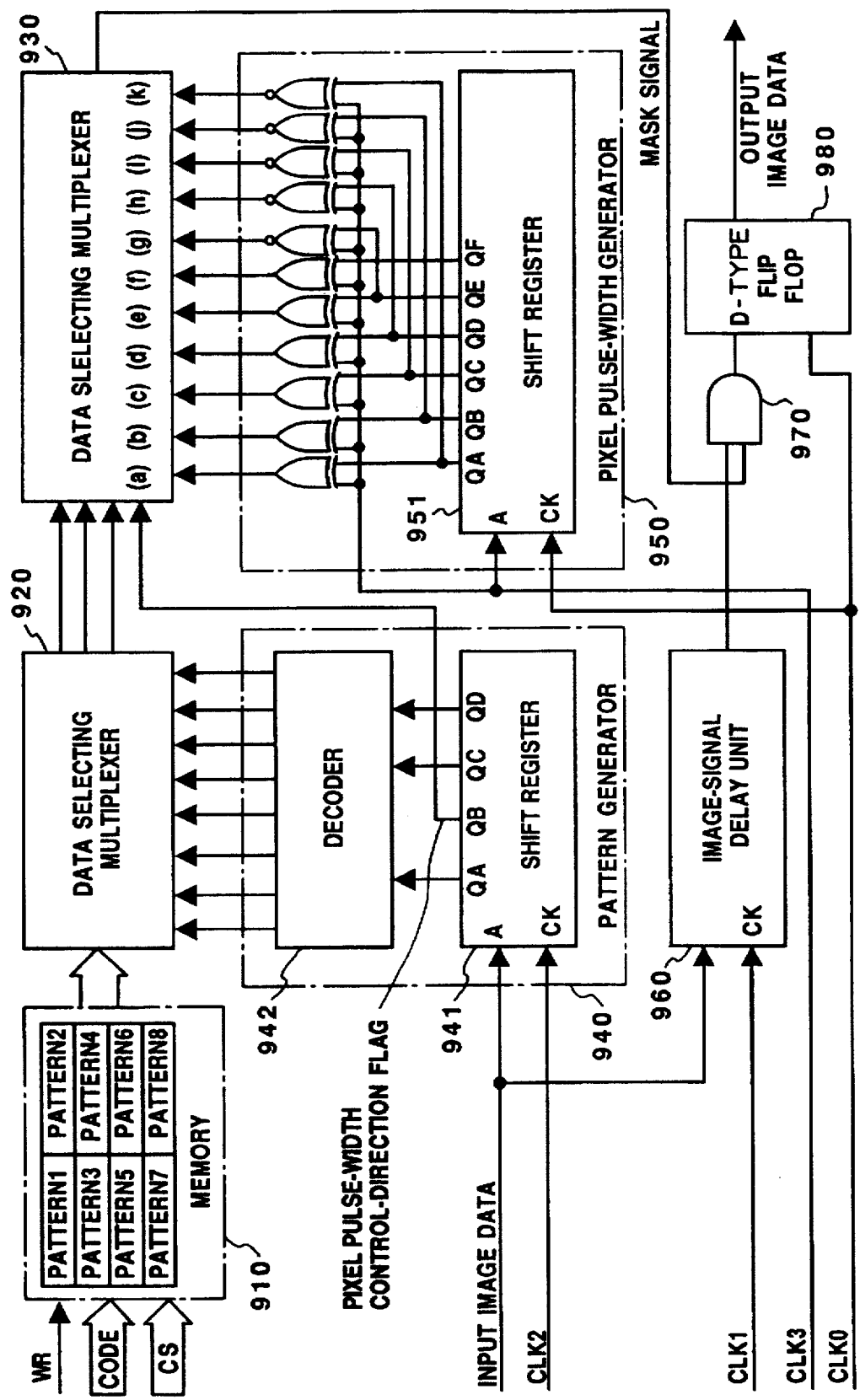
Figure 42:
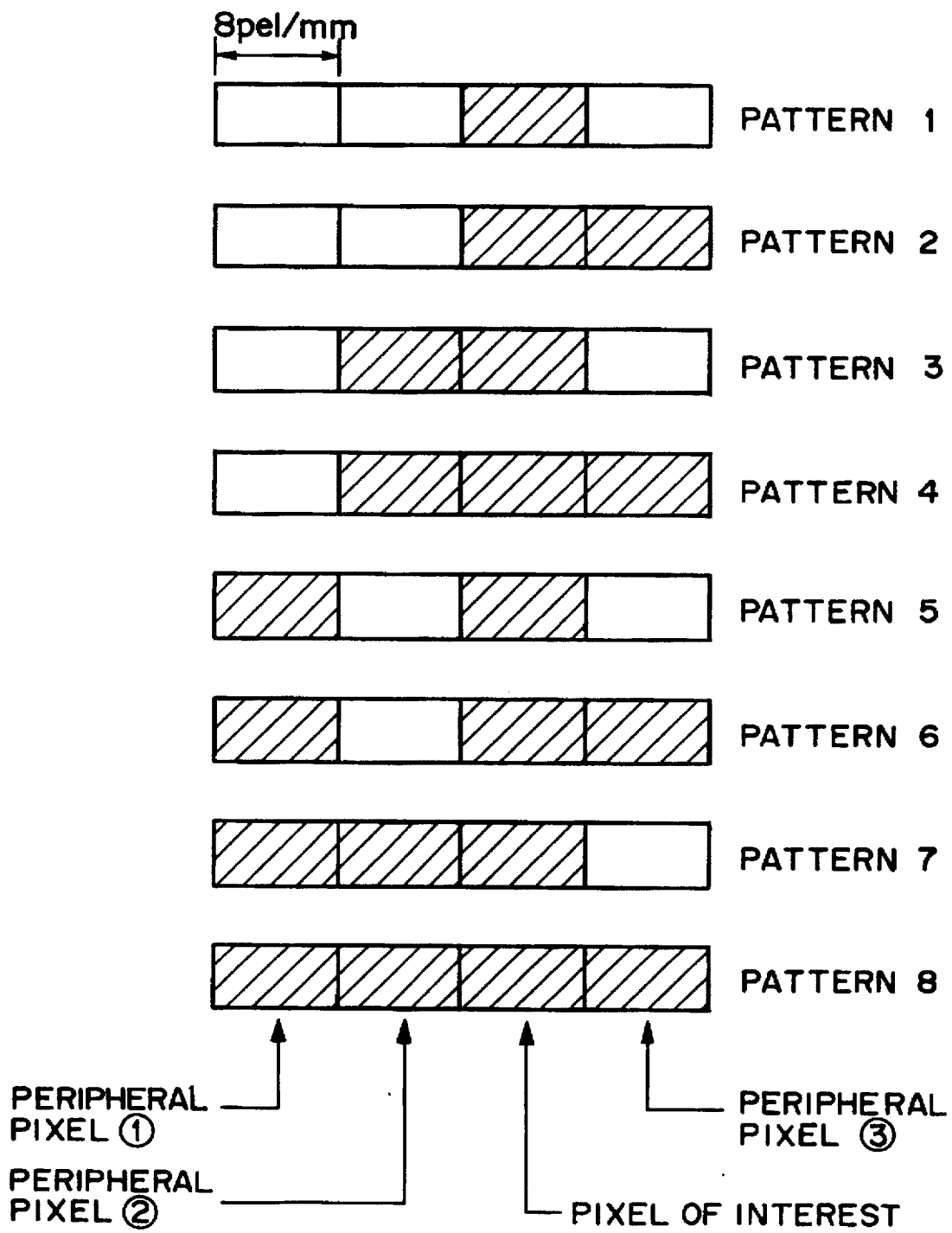
Figure 43A:
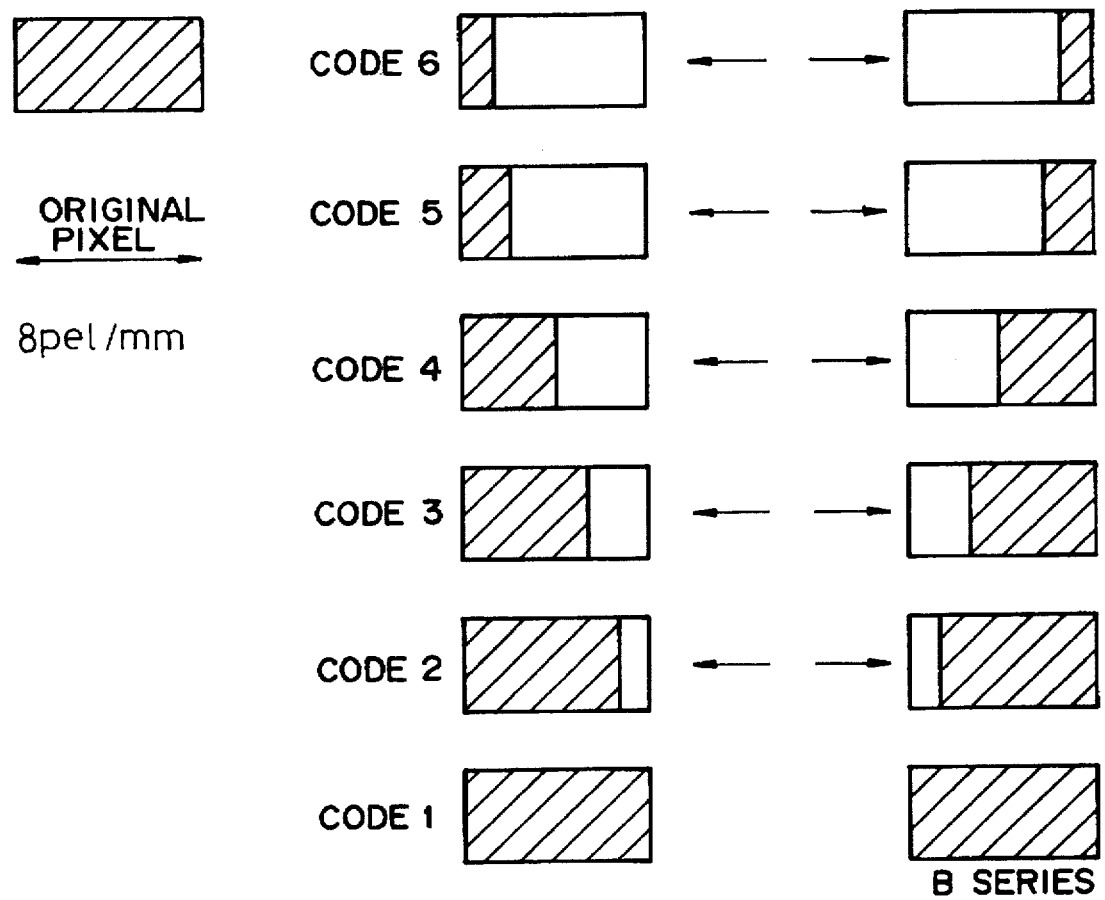
Figure 43B:
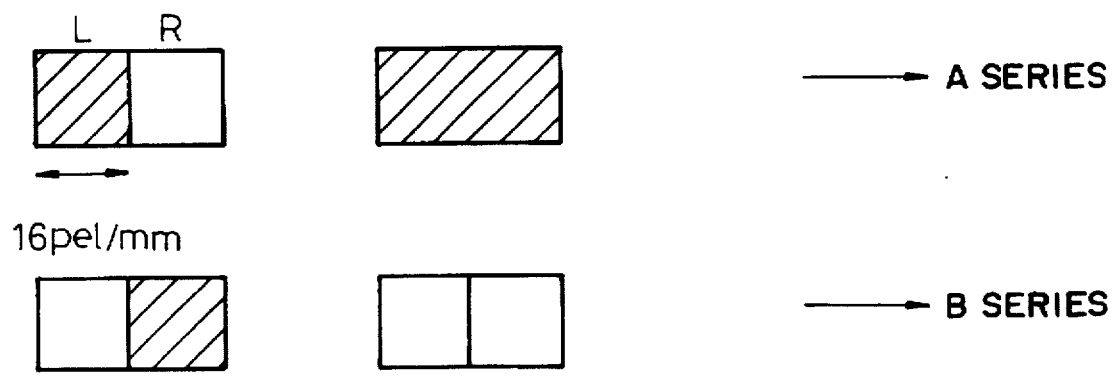
Figure 44:
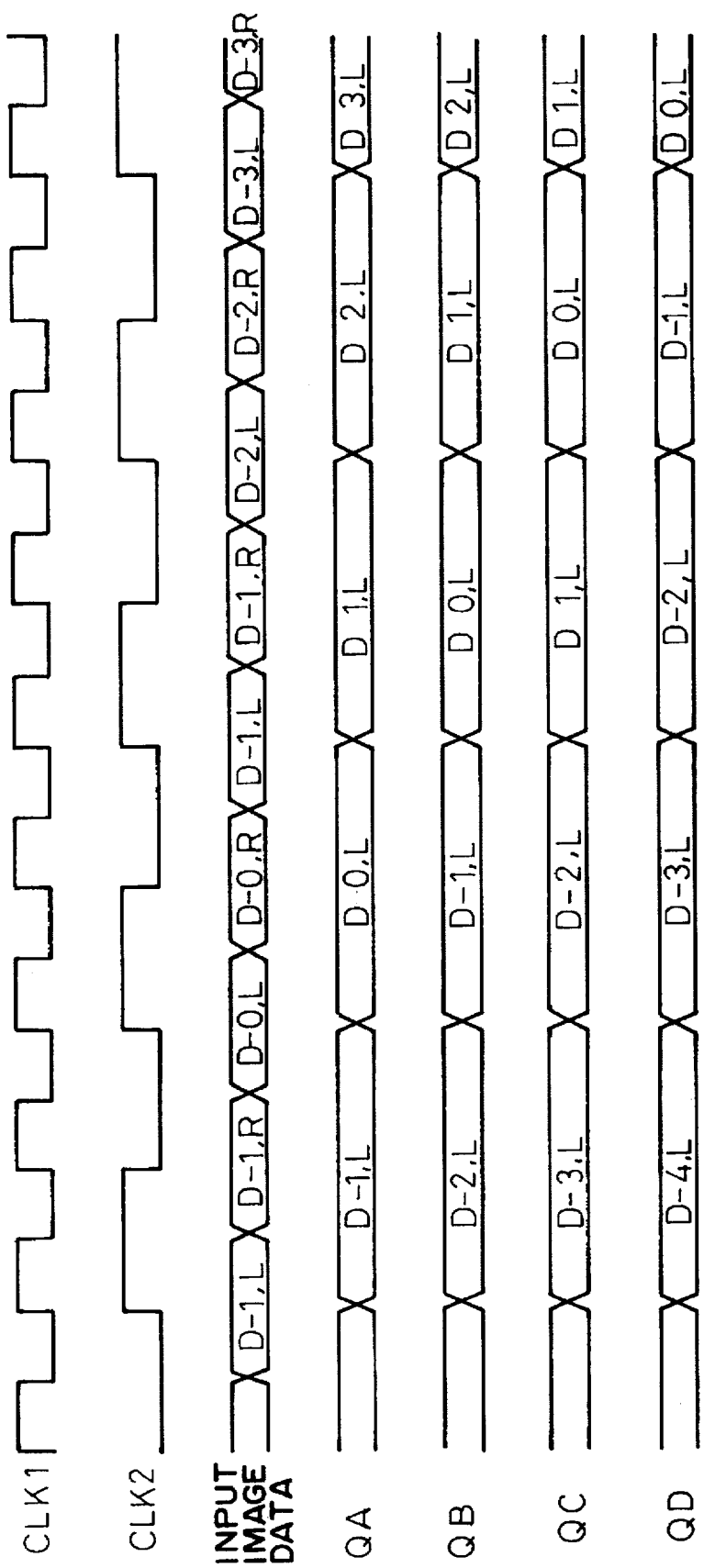
Figure 45:
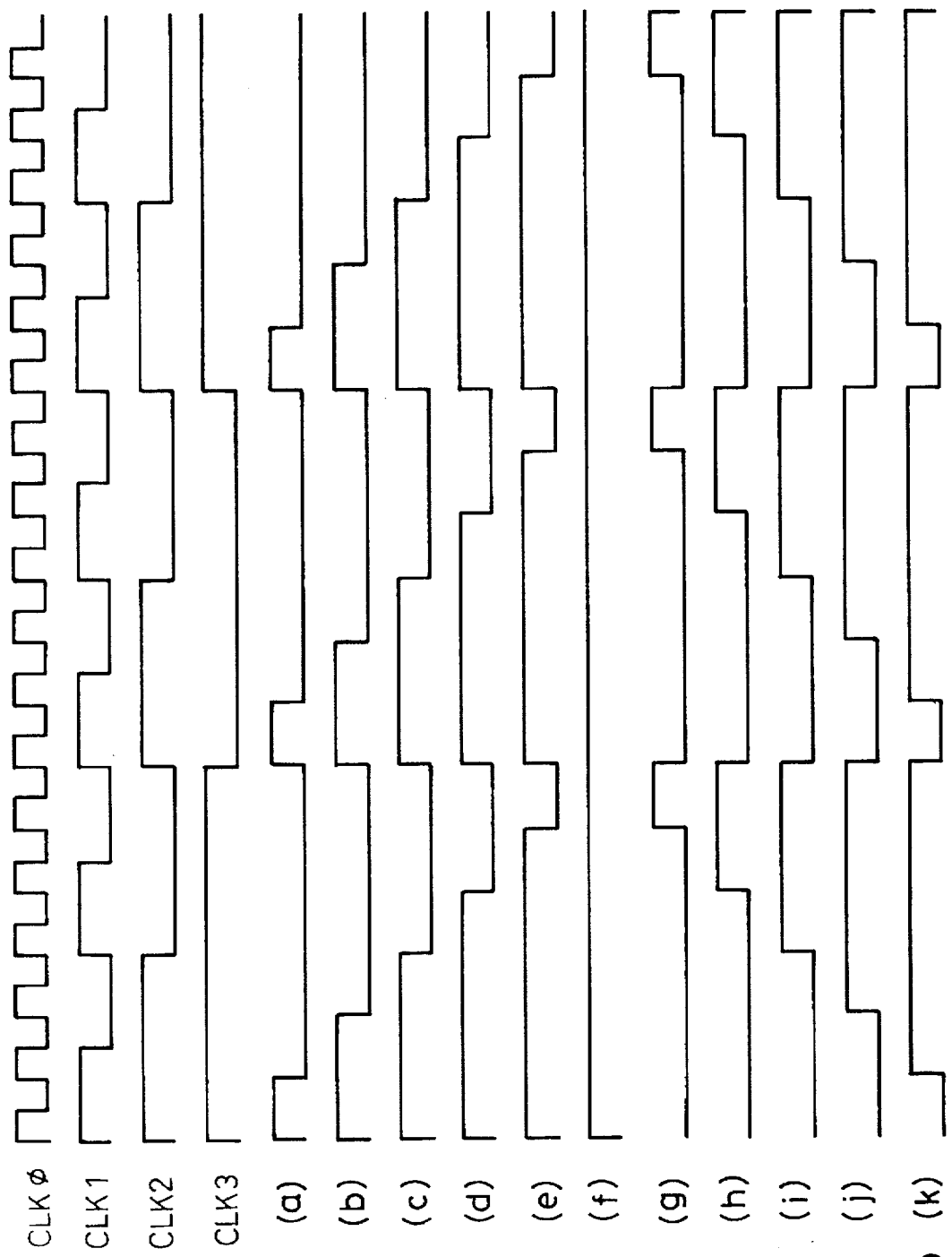
Figure 46A:
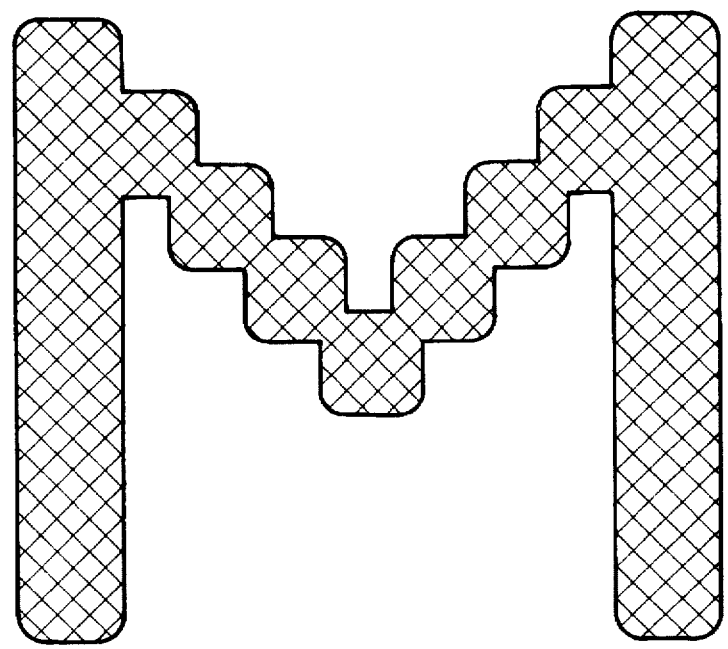

FIG. 38 is a diagram for describing an algorithm based upon the spatial frequency of image discrimination;

FIG. 39 is a diagram for describing an algorithm based upon the periodicity of image discrimination;

FIGS. 40(a)–40(d) are diagrams for describing an algorithm based upon isolated pixels in image discrimination;

FIG. 41 is a block diagram showing the construction of a pixel pulse-width control circuit in the third embodiment;

FIG. 42 is a diagram for describing black-and-white pixel patterns;

FIG. 43(a) and 43(b) are diagrams showing pixel patterns which decide pixel pulse-width control direction;

FIGS. 44 and 45 are timing charts for describing the operation of the pixel pulse-width control circuit; and FIGS. 46(a) is a diagram showing an example of an ordinary output, and 46(b) a diagram showing an example of an output according to this embodiment.

DESCRIPTION OF THE PREFERRED EMBODIMENTS

Preferred embodiments according to the present invention will now be described with reference to the drawings.

<First Embodiment>

FIG. 1 is a block diagram showing the construction of a pixel-density converting apparatus according to a first embodiment of the invention. As shown in FIG. 1, binary image data representing the density of one bit (in which black is represented by "1" and white by "0") enters a pixel-density converting circuit 2 through a data line 3. The pixel-density converting circuit 2 is adapted to subdivide the binary image data of one bit, which has entered from the data line 3, based upon an image synchronizing signal outputted by a timing control circuit 1, perform interpolation processing in dependence upon the density of a pixel of interest and the pattern of peripheral pixel densities, and output binary image data on a data line 4 in synchronization with an image clock that conforms to a high-density conversion in the main scanning direction.

In this embodiment, the binary image data inputted to the pixel-density converting circuit 2 is obtained by decoding facsimile data transmitted via a telephone line. This is image data having a low resolution.

Circuitry according to an embodiment constructed as set forth above will now be described in detail with reference to the drawings.

<Timing Control Circuit>

The timing control circuit 1 sends clock signals CLK1 and CLK2, which are based upon a basic clock, to the pixel-density converting circuit 2. The CLK1 is a clock signal having a period identical with that of the inputted image clock. In this example, CLK1 corresponds to a pixel density of 8 pel/mm in the main scanning direction. The CLK2 is a pixel clock signal after execution of pixel-density conversion processing. This clock has a speed which is an integral number of times that of CLK1 in conformity with the pixel subdivision in the main scanning direction.

<Pixel-Density Converting Circuit>

FIGS. 2 and 3 are diagrams showing an example of the detailed construction of the pixel-density converting circuit 2. This circuit is for an example in which doubling is performed in each of the main and subordinate scanning directions. In outputting an input of binary image data (having a pixel density of 8 pel/mm in the main scanning direction and 7.7 lines/mm in the subordinate scanning direction), the circuit subdivides the data (into a pixel density of 16 pel/mm in the main scanning direction and 15.4 lines/mm in the subordinate scanning direction) and outputs the resulting data upon reversing the density of the subdivided pixels in dependence upon the peripheral pixel pattern. As a result, contour smoothing of slanted-line portions in a character image or the like is performed.

As shown in FIGS. 2 and 3, the pixel-density converting circuit includes line memories 211–215 which hold the inputted binary image data, shift registers 22A–22Y, a density-value deciding circuit 230 which, based upon an inputted matrix, decides individual pixel densities resulting from the subdivision processing, and a line selector 240 for extracting, line by line in synchronization with the image clock CLK2, the individual items of image data which enter in parallel from the density-value deciding circuit 230. The operation of this circuit will now be described in detail with reference to the drawings.

First, one line of binary image data in the main scanning direction is read in the line memory 211 of the line memory group, and this data is shifted, in line units, in the subordinate scanning direction in the following manner: line memory 212→213→214→215. The image data from the line memories 211–215 is read out in synchronization with CLK1 outputted by the timing control circuit 1 so that five pixels of parallel data in the subordinate scanning direction are shifted to respective ones of the shift registers 22Y, 22T, 22O, 22J, 22E. The five pixels of image data in the subordinate direction thus shifted in are shifted successively through the shift registers in synchronization with CLK1. Here matrix data of 5 lines ×five pixels is extracted from the shift registers 22A–22Y, and this data is inputted to the density-value deciding circuit 230.

The density-value deciding circuit 230 outputs pixel data M11–M22, which is obtained by subdividing or breaking up a pixel of interest (the data in shift register 22M in this example), which is located at the center of the 5×5 array, into four parts and performing interpolation processing. The outputted data enters the line selector 240 in parallel fashion. The line selector 240 selects the image data of the output line and outputs the subdivided image data in synchronization with the output image clock CLK2. FIGS. 4 and 5 illustrate the details of the line selector 240.

In FIG. 4, the interpolated pixel data M11, M12, M21, M22 from the density-value deciding circuit 230 enters the multiplexers 241, 242 in synchronization with the image clock CLK1 of the pixel prior to subdivision. The pixel data (M11, M12 in this example) of the outputted line is selected by multiplexers 241, 242, and the selected pixel data enters AND gates 243, 244. The pixel data (e.g., M11, M12) whose density has been doubled in the main scanning direction is successively selected in accordance with CLK1 by a selector constructed by the AND gates 243, 244 and an OR gate 245. The selected pixel data is finally delivered to a D-type flip-flop 246 which, in synchronization with the pixel clock CLK2, outputs image data (OUT in FIG. 5) that has been subdivided in the main scanning direction.

Whenever one line is read in the line memory 211, the multiplexers 241, 242 are changed over sequentially to extract two lines of subdivided pixel data, whereby image data subdivided in the subordinate scanning direction can be obtained. By repeating similar processing using the output of the density-value deciding circuit 230 as new matrix data, it is possible to obtain a high-density converted image whose density has been multiplied four-fold in the main and subordinate directions or eight-fold in the main and subordinate directions, etc.

Next, the relationship between the matrix data inputted to the density-value deciding circuit 230 and the outputted subdivided image data will be described in detail. FIG. 6 is a diagram showing a pixel of interest and subdivided pixels according to this embodiment. In FIG. 6, M represents the pixel of interest, A through Y represent referential pixels, and M11 through M22 represent subdivided pixels. FIGS. 7, 8 and 9 illustrate patterns for deciding the density values of the individual subdivided pixels versus the density values of the referential pixels.

In FIGS. 7 through 9, no reference is made to the pixels crossed out. In the patterns which decide the density values, the referential pixels determine whether the pixel of interest is part of a slanted line, a portion which indicates a right angle, or some other portion. In FIGS. 7 and 8, (a) through (l) illustrate patterns for performing interpolation processing in a case where the pixel of interest is a white pixel. In case of (a), the referential pixels H and L in FIG. 6 are black and the referential pixels I and Q are white, wherein it is judged that the pixel of interest is part of a black slanted line whose inclination is $\tan\theta = 1$. The density of M11 is reversed from white to black. Similarly, in case of (b) through (d), the pattern (a) is rotated successively 90° each time owing to symmetry. In case of (e), the referential pixels H, I and L in FIG. 6 are black and the referential pixel Q is white, wherein it is judged that the pixel of interest is part of a black slanted line whose inclination is $\tan\theta = \frac{1}{2}$. The densities of the two pixels M11 and M12 are reversed from white to black. In case of (f) through (h), the pattern (e) is rotated successively 90° each time owing to symmetry. In (i) through (l), the pattern (e) is flipped over and then rotated successively 90° each time. On the other hand, (m) through (t) illustrate patterns for performing interpolation processing in a case where the pixel of interest is a black pixel. In case of (m), the referential pixels G, H, I, J and L in FIG. 6 are white and the referential pixel Q is white, wherein it is judged that the pixel of interest is part of a white slanted line whose inclination is $\tan\theta = \frac{1}{3}$. The densities of the two pixels M11 and M12 are reversed from black to white. Similarly, in case of (n) through (p), the pattern is rotated successively 90° each time owing to symmetry. In case of (q) through (t), the pattern is flipped over and then rotated successively 90° each time.

The individual actions of the interpolation processing in each pattern will now be described.

(1) Detection of right angles

In case of a pattern other than those described above, density is not reversed and the density of each subdivided pixel is made a density identical with that of original image. As a result, when the pixel of interest is white and the referential pixels H, I, L, Q are black, for example, it is determined that a right-angle portion is present, interpolation processing is not executed and the right-angle portion is reproduced clearly.

(2) Detection of inclination of slanted lines

Figure 10A:
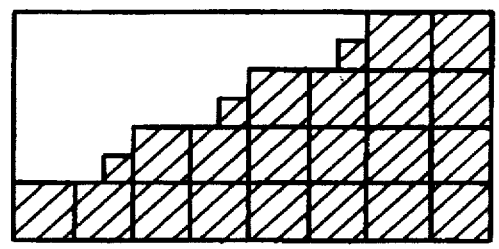
Figure 11A:
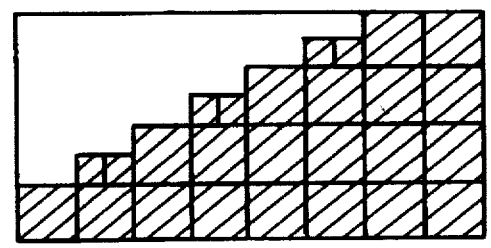

In a case where the pixel of interest is a white pattern, as in patterns (a) through (l), the number of subdivided pixels reversed in density from white to black in patterns (a) through (d) differs from that in patterns (e) through (l). By thus detecting the inclination of a slanted line and changing the number of pixels which undergo a reversal in density depending upon a difference in inclination, an image whose contours are smoothed more effectively with regard to steeply inclined slanted lines and gently inclined slanted lines can be obtained. FIGS. 10(a) and 11(a) show the results of applying interpolation processing for a slanted line tanθ=½ to an original image shown in FIG. 12(a). FIG. 10(a) is an example of one-pixel interpolation, and FIG. 11(a) is an example of two-pixel interpolation by the present algorithm. Similarly, in a case where the pixel of interest is a black pattern, as in patterns (m) through (t), two pixels undergo a density reversal from black to white so that more effective contour smoothing can be applied to steep slanted lines and gently slanting lines.

(3) Preventing the cancellation of the interpolating effect in slanted lines having inclinations of tanθ=1, ½, 2

Figure 10B:
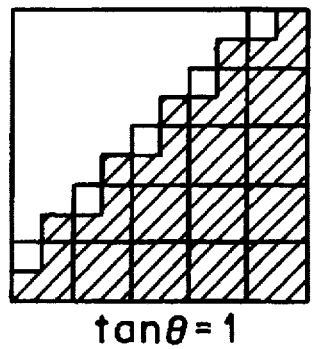
Figure 10C:
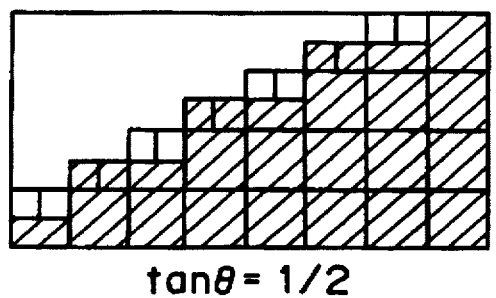
Figure 10D:
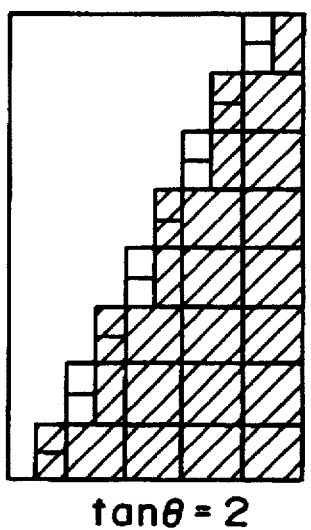
Figure 11B:
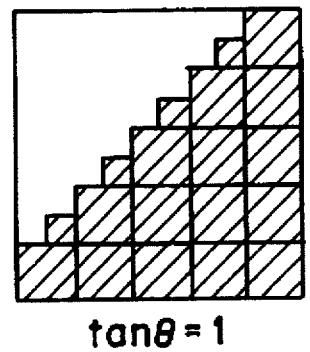
Figure 11C:
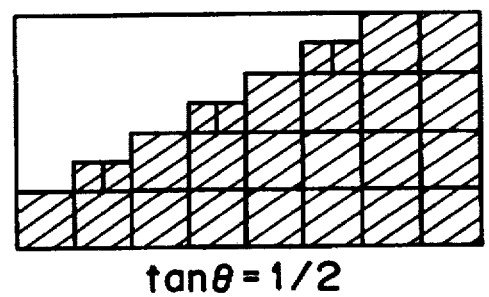
Figure 11D:
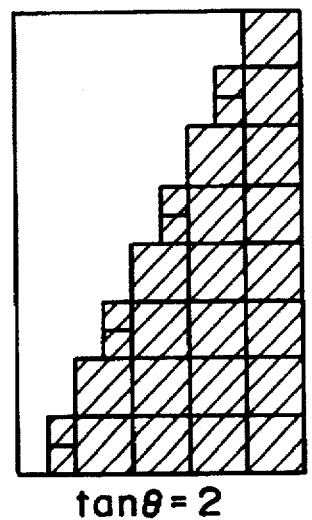
Figure 12A:
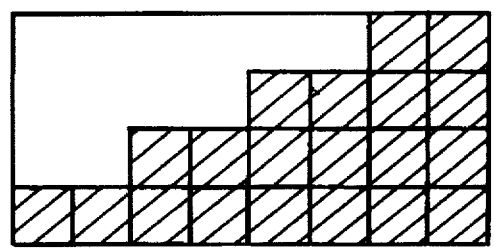
Figure 12B:
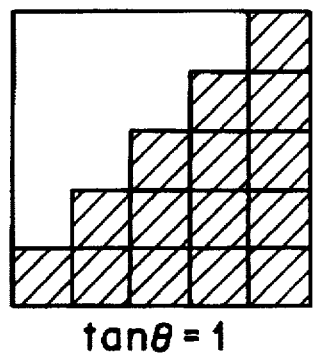
Figure 12C:
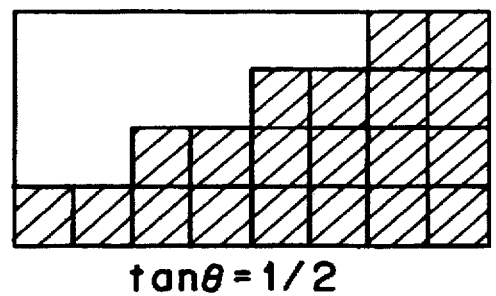
Figure 12D:
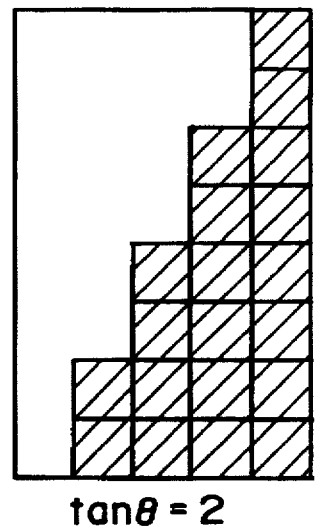

The inclination of the slanted-line detection pattern which undergoes density reversal in a situation where the pixel of interest is a white pattern as in (a) through (l) differs from that in a situation where the pixel of interest is a black pattern as in (m) through (t). When a pattern in which white and black are reversed with respect to individual pixels in the patterns (a) through (l) is used in a situation where the pixel of interest is a white pattern, the interpolation processing is cancelled out with regard to slanted lines tanθ=1, ½, 2, as illustrated in FIGS. 10(b) through (d), in a case where the original image is as illustrated in FIGS. 12(b) through (d). As a result, the steps of the slanted lines are merely shifted and the effect of interpolation is lost. Consequently, by changing the angle of slanted-line detection (performing processing with respect to tanθ=⅓ when the pixel of interest is black) between the case where the pixel of interest is a white pattern (a) through (l) and a case where the pixel of interest is a black pattern (m) through (t), it is possible to apply effective contour smoothing to slanted lines tanθ=1 and tanθ=2 as well. FIGS. 11(b) through (d) show the results of performed interpolation processing based upon the present algorithm.

Figure 13B:
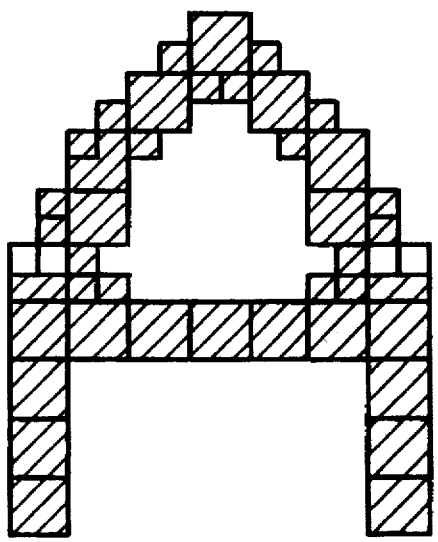
Figure 13C:
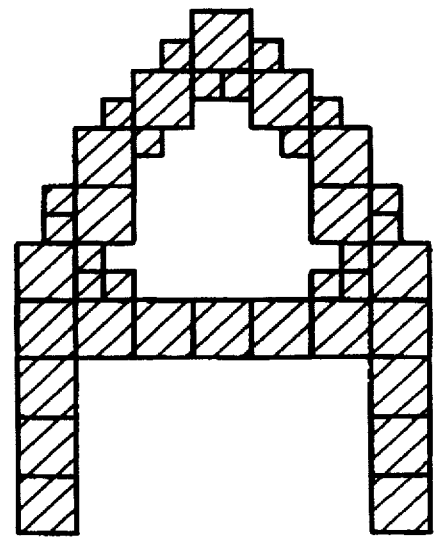

(4) Preventing missing black slanted lines owing to a fine slanted-line judgment In a case where the pixel of interest is a black pattern, as in patterns (m) through (t), reference is made to G, I, Q, S shown in FIG. 6. However, when the pixel of interest is a white pattern, as in patterns (a) through (l), no reference is made to G, I, Q, S. In other words, contour smoothing is applied effectively to black slanted lines composed of connected individual dots, and no interpolation processing is applied to white slanted lines composed of connected individual dots. As a result, it is possible to prevent missing connections in fine, black slanted lines, which is a side effect of the contour smoothing of white slanted lines. FIG. 13(b) is an example of a case in which black slanted lines are missing, where the original image is as shown in FIG. 13(a). FIG. 13(c) shows an example in which processing has been executed in accordance with the present algorithm.

A circuit in which the above-described patterns are formed by logic circuitry is the density deciding circuit 230. This circuit is constructed as a logical operation unit for pixel density conversion. An example of another method is to use a ROM in which the outputs of the registers A through Y are adopted as 25-bit address inputs and the densities of M11 through M22 have been written in as data.

In accordance with this embodiment, as described above, low-resolution image data sent from a facsimile is outputted upon being raised in density to conform to the resolution of the recording system. As a result, it is possible to improve the picture quality of lines such as characters.

Further, in accordance with this embodiment, as described above, when a binary image is converted to a higher density and interpolated, more effective conversion patterns are proposed and the interpolation upon conversion to higher density is performed by a simple logic operation without using a pattern memory.

Furthermore, appropriate interpolation processing conforming to the angles of slanted lines to be interpolated is possible, and it is possible also to obtain high-quality converted images in which the phenomenon of missing black slanted lines caused by the interpolation effect is eliminated.

<Second Embodiment>

A second embodiment according to the present invention will now be described in detail with reference to the drawings.

FIGS. 14 and 15 are block diagrams showing the construction of an image processing apparatus according to the second embodiment. Here a laser-beam printer (not shown) is used as the output unit. Also, the inputted image data is binary image data which has been subjected to pseudo-half-tone processing, such as error diffusion processing. More specifically, the image data is binary image data consisting of a mixture of a character image, which is obtained by decoding facsimile data sent via a line (not shown), and a pseudo-half-tone image.

In FIG. 14, numeral 11 denotes a memory wherein code data, which decides the duration of printing of the pixel of interest, has been stored with respect to patterns comprising three pixels in the main scanning direction in the proximity of the pixel of interest. The above-mentioned patterns are as shown in FIG. 21(a). Codes [FIG. 21(b)] corresponding to the printing durations (black widths) during which a laser beam is turned on are stored in the memory 11 with respect to patterns 1 through 8, by way of example. These codes can be set at will for each pattern.

In FIG. 14, a fine slanted-line pattern detector 12 determines, by pattern matching, whether the pixel of interest is part of a fine, slanted line. The circuit 12 outputs a "1" when the pixel of interest is part of a fine, slanted line. As shown in FIG. 22, the detector 12 comprises a line-buffer group 501, a shift-register group 502 and a fine slanted-line discriminating circuit 503. The image data inputted to the line-buffer group 501 first is accepted by a line buffer a and then the data is shifted successively, in line units and in synchronization with a line synchronizing signal, in the subordinate scanning direction from line buffer a to line buffer b and thence to line buffer c. In the shift-register group 502, three pixels of data in the subordinate scanning direction are inputted from the line-buffer group 501, and these three pixels of data in the subordinate scanning direction are shifted successively in synchronization with the input pixel clock.

By virtue of the foregoing operation, matrix data of three pixels in the main scanning direction and three pixels in the subordinate scanning direction (UL, UM, UR, ML, MM, MR, DL, DM, DR), for a total of nine pixels, is extracted from the individual shift registers of the shift-register group 502 in synchronization with the image clock, as shown in FIG. 23(a), and the matrix data enters the fine slanted-line discriminating circuit 503. On the assumption that a black pixel is high ("H"), a white pixel is low ("L") and the position of a pixel of interest is MM, the fine slanted-line discriminating circuit 503 is constructed as shown in FIG. 24. When matrix data having any of the patterns shown in (b) through (e) of FIG. 23 enters the fine slanted-line discriminating circuit 503, the latter outputs "H" by executing logical operations. For example, in case of the pattern (b) shown in FIG. 23, data in which UR is "H", MM is "H", UM is "L" and MR is "L" enters the fine slanted-line discriminating circuit 503, the AND 1 gate whereof opens so that "H" is produced as the output of the circuit.

In FIG. 14, matrix data is extracted by a line-buffer group and a shift-register group by a character-image area detector 13 in the same manner as in the fine slanted-line pattern detector 12. Here the characteristics of a pseudo-half-tone image, namely the ratio of high-frequency components and the absence or presence of periodicity seen in a dither image, for example, are detected. In addition, the number of reversals of pixels neighboring an isolated pixel within the matrix, the number of pixels having periodicity every four pixels, and the number of pixels wherein four pixels adjacent to the pixel of interest are all different from the pixel of interest are counted, and the counts are compared with fixed threshold values to detect the various characteristics. If even one of the characteristics applies, it is judged that the pixel of interest is contained in a pseudo-half-tone area, and "H" is outputted.

On the basis of a basic clock, a timing control circuit 15 sends clocks CK0, CK1, CK2 to a pattern generator, a printing duration generator 20 and an image-data delay unit 22, described later, and controls the printing duration conforming to the pattern of the inputted image data.

The pattern generator includes a shift register 16 and a decoder 17. The shift register 16 receives the pixel data as an input and delivers data indicative of the periphery of the pixel of interest to the decoder 17 as an output. The AND outputs of the data from the fine slanted-line pattern detector 12 and the character-image area detector 13 enter a PR (preset) terminal of the shift register 16. If it is determined that an image is a character and part of a fine slanted line thereof, a pattern which selects a code that does not perform control of the printing duration is outputted, with data $Q_A$–$Q_D$ being all "1"s. The decoder 17 receives three-bit data from the shift register 16 as an input, decodes this data and outputs data $Y_0$–$Y_7$.

A data selecting multiplexer 18 receives the data from the decoder 17 as an input, uses the data as an address and outputs, as three-bit data, a code that has been stored in the memory 11. On the basis of the code received from the data selecting multiplexer 18, a data selecting multiplexer 19 selects one of the pulse widths generated by the printing duration generator 20 and outputs the same to an AND gate 21 as a mask signal. The printing duration generator 20 includes a shift register, an exclusive-OR gate, etc., and outputs clocks having different pulse widths, as illustrated at A through F in FIG. 16.

The AND gate 21 takes the AND between the mask signal and the signal indicative of the pixel of interest synchronized by the image-data delay unit 22, and outputs data whose printing duration has been controlled in dependence upon the pattern applied to a D-type flip-flop 23. The latter provides a laser-beam printer (LBP) with an output of image data for printing. The LBP will be described in detail later with reference to FIGS. 18, 19 and 20.

The operation of the present apparatus constructed as set forth above will now be described.

In this embodiment, the aforementioned memory 11 is constructed as a 3×8-bit data register, and three-bit binary codes, which are indicative of pixel printing duration, written in dependence upon black-and-white patterns of three pixels in the main scanning direction of the input image data prior to the start of printing are stored in the memory in correspondence with patterns 1 through 8. The printing duration codes corresponding to the patterns 1 through 8 are set at will.

As shown in FIG. 21(a), the black-and-white patterns of three pixels are each composed of three pixels ① through ③ which bracket the pixel of interest in the main scanning direction, with the two pixels ① and ② being located in front of the pixel of interest and the pixel ③ being located in back of the pixel of interest. These patterns 1 through 8 are represented in regular order and are determined by whether the pixels are white or black. The codes indicative of printing duration are as illustrated in FIG. 21(b). On the assumption that one dot of 200 dpi is the original black width (100), 100 is made to correspond to printing duration as a code 1. Similarly, 83.3 is made to correspond to printing duration as a code 2, 66.7 as a code 3, 50.0 (one dot of 400 dpi) as a code 4, 33.3 as a code 5, and 26.7 as a code 6.

In FIGS. 14 and 15, image data enters from input A of the shift register 16 and a 200 dpi one-bit synchronizing clock CK enters from CK2 of the timing controller 15, whereupon the shift data of $Q_A$–$Q_D$ shown in FIG. 17 are outputted in synchronization with the leading edge of CK2. Here $Q_A$, $Q_C$, $Q_D$ are patterns generated in correspondence with the above-mentioned peripheral pixels ③, ②, ①. The data from the AND gate 14 is outputted to the shift register 16. As a result, in a case where it is decided that the pixel of interest is part of a fine, slanted line in a character, all of the items of data $Q_A$ through $Q_D$ are made high, all of the peripheral pixels are made black, and a pattern which selects a code that does not perform control of printing duration is outputted.

Next, the patterns $Q_A$, $Q_C$, $Q_D$ are outputted to the decoder 17, where they are decoded as an address according to which the data selecting multiplexer 18 selects one relevant pattern from the patterns 1 through 8 in memory 11. The three-bit printing duration code corresponding to each pattern is outputted from the data selecting multiplexer 18 to $D_A$ through $D_C$ of the data selecting multiplexer 19.

Meanwhile, CK0, CK1 from the timing controller 15 are inputted to the printing duration generator 20 which, by taking the exclusive-OR, provides the data selecting multiplexer 19 with an output of timing signals, shown at A through F in FIG. 16, indicative of printing durations. In the data selecting multiplexer 19, one of these timing signals is selected, in accordance with the above-mentioned three-bit printing duration code, from among the six types of timings inputted to $D_0$ through $D_5$, and the selected timing signal is delivered to the AND gate 21 as the mask signal.

Next, the AND gate 21 takes the AND of the pixel of interest outputted by the image-data delay unit 22 and the mask signal and applies the result of the AND operation to the D-type flip-flop 23. The signal from the flip-flop 23, which is synchronized to CK0 from the timing controller 15, is outputted to the printer as image data to be printed.

FIGS. 18, 19 and 20 are diagrams illustrating the laser-beam printer serving as the printing apparatus of this embodiment. As illustrated in these drawings, the image data for printing is controlled and inputted in hardware and software fashion through a video interface 31. Numeral 32 denotes the controller of a printer engine, 33 a laser unit, 34 a polygon mirror, 35 a drum and 36 a BD mirror for outputting main-scanning synchronization.

An image of character "B" (FIG. 18) is stored in a memory 37 within a video controller. This image is converted into a video signal of the kind indicated at 38 in FIG. 18. The signal is outputted sequentially to the printer engine from a 1st line to a 16th line in synchronization with a BD signal. The black portions on the respective lines shown at 38 in FIG. 18 are timing signals for turning on the laser unit 33.

In this embodiment, the data on one main scanning line is printed two consecutive times. As a result of this processing, 200 dpi data in the subordinate scanning direction can be printed at a recording density of 400 dpi. With regard to the main scanning direction, a 400 dpi conversion is made and processing for producing a finer image is performed.

An example in which printing duration is made variable in relation to peripheral pixels will be described with reference to FIGS. 25 and 26.

FIG. 25 illustrates the codes corresponding to patterns 1 through 8 in this embodiment. FIG. 26 is a diagram showing an pattern strings of black and white pixels in which all patterns appear, as well as outputs of printing duration corresponding to these pattern strings. As illustrated, the printing duration is short at locations where pixels are comparatively few at the periphery and long at locations where there are many black pixels. In an area where black pixels are contiguous, the printing duration is substantially the same as that of an input pixel, and therefore the reproducibility of entirely black portions is not lost.

Furthermore, in a case where the pixel of interest is part of the fine slanted line of a character, the shift register 16 of FIG. 14 is preset so as to select pattern 8. As a result, the reproducibility of the slanted line is not lost.

As described above, when a printer having a dot density higher than the pixel density of data to be recorded is used, the printing duration of the minimum unit of a pixel is varied at will or, in a thermal-transfer printer, the thermal capacity is varied at will, after which the video signal is outputted. As a result, the density of a printed portion of only one pixel of a pseudo-half-tone can be reproduced faithfully without blackening of the entire image. Furthermore, owing to the signals from the fine slanted-line pattern detector 12 and the character-image area detector 13, a character image can be obtained in which the phenomenon of missing fine, slanted lines is eliminated.

<Modification of Second Embodiment>

In the foregoing embodiment, an example is described in which a pattern is selected upon referring to pixels peripheral to the pixel of interest, printing of the main scanning line is performed and data identical with that of the preceding line is printed in the subordinate scanning direction. However, it is possible to adopt an arrangement in which one pattern is selected from among patterns which take the subordinate scanning direction into account. In such case, patterns which take the subordinate scanning direction into account are prepared as the peripheral pixels in FIG. 21(a). For example, it will suffice to select a code, which controls the printing duration, by decoding 3×3 matrix data from the fine slanted-line pattern detector 12. Also, when printing in the subordinate scanning direction is performed twice, it is possible to faithfully reproduce fine lines in the main scanning direction by thinning out the printing data. Furthermore, when the pattern generator using the shift register 16 generates multivalued data, it will suffice if code setting of the decoder input or of the patterns 1–8 is carried out in such a manner that the printing duration is lengthened when a multivalued level is high (dark) and shortened when a multivalued level is low (faint).

In addition, by arranging it so that the user sets the density externally using a density key and the set data is inputted to the decoder 17, the light and dark shades of a printing image can be set without relation to the reading density. The number of peripheral pixels in FIG. 21(a) may be greater than three. A larger number of pixels makes it possible to set the printing duration more faithfully. Further, six types of printing durations are shown in FIG. 21(b). However, as apparent from the basic clock and the relationship of the outputs A through F, the setting of the printing durations can be subdivided further by speeding upon the basic clock within one dot, and therefore the types of printing durations can be increased.

Furthermore, a laser-beam printer has been described as an example of the printer in the foregoing embodiments. However, if the printer is one having a dot density higher than the density of the data to be recorded, such as an ink-jet printer, thermal-transfer printer or thermal printer, then, when the same dot is printed twice, a similar effect can be obtained by variably controlling the ink quantity of thermal capacity of one of the dots, in the same manner as the length of the light-emission time of the laser beam is controlled.

Though the pixel density of the image data is 200 dpi and the printing pixel density of the printer is 400 dpi in the foregoing embodiments, the present invention is not limited to these densities. It goes without saying that the densities can be enlarged to 100 dpi vs. 400 dpi, 200 dpi vs. 600 dpi, etc.

In accordance with the embodiment described above, a faithful reproduction can be produced without blackening of the entire image and without the phenomenon of missing fine slanted lines in characters. The density of a portion in which only one pixel of a pseudo-half-tone is printed can be faithfully reproduced, and an improved high-contrast image an be obtained.

<Third Embodiment>

A third embodiment of the present invention will now be described with reference to the drawings.

FIG. 28 is a simplified block diagram showing the construction of an image processing apparatus according to the third embodiment. Numeral 100 denotes a timing control circuit which, based upon a basic clock, produces an image clock synchronized to input image data, an image clock synchronized to image data converted to a higher density, and a clock for forming pulses for the purpose of controlling printing duration. Numeral 300 denotes an image discriminating circuit for determining, from the inputted image data, whether a pixel of interest is contained in a character image area or a pseudo-half-tone area, and outputting the result to a contour-smoothing enlargement circuit 200 as a decision flag. The contour-smoothing enlargement circuit 200 receives the image data as an input, subdivides a pixel, which has been determined to be of a character image by the image discriminating circuit 300, into two portions in the main scanning direction and $2^m$ (where m is an integer) in the auxiliary scanning direction, decides the density values of the subdivided pixels of the pixel of interest based upon the density value of the original pixel and the density values of the pixels peripheral thereto, and produces an output upon raising density. Numeral 400 denotes a pixel pulse-width control circuit, which receives the data from the contour-smoothing enlargement circuit 200 as an input, for controlling the printing duration of the pixel of interest based upon the positions of black pixels interpolated by high-density conversion processing in the pixel array pattern in the main scanning direction of the image data of the resolution that prevailed prior to the high-density conversion and the pixel of interest. The controlled printing duration is delivered to an output unit, such as a laser-beam printer, which is not shown.

In this embodiment, the inputted image data is binary data obtained by decoding facsimile data sent via a line, for example, and pixel density is 8 pel/mm in the main scanning direction and 7.7 lines/mm in the subordinate scanning direction. The pixel density of image data outputted upon undergoing the pixel-density conversion in the above-mentioned contour-smoothing enlargement circuit is 16 pel/mm in the main scanning direction and 15.4 pel/mm in the subordinate scanning direction.

The details of the apparatus having the construction set forth above will now be described with reference to the drawings.

<Timing Control Circuit>

Based upon a basic Clock (CLK0), the timing control circuit 100 produces clocks CLK1, CLK2 and CLK3. The clock CLK1 is a pixel clock following contour smoothing enlargement. This clock is obtained by frequency-dividing CLK0 by three and corresponds to a pixel density of 16 pel/mm. The clock CLK2 is a clock having a period the same as that of the input image clock. This clock is obtained by frequency-dividing CLK0 by six and corresponds to a pixel density of 8 pel/mm. The clock CLK3 is a data clock which forms a mask clock for pixel-pulse control (control of printing duration, in which a time when the signal level is "H" is made to correspond to the printing duration for black). The clock CLK3 is obtained by frequency-dividing CLK0 by 12. These clock signals are sent to the contour smoothing enlargement circuit 200, the image discriminating circuit 300 and the pixel pulse-width control circuit 400.

<Contour-Smoothing Enlargement circuit>

FIGS. 29 and 30 are diagrams showing a specific example of the construction of the contour smoothing enlargement circuit 200. This circuit is for an example where doubling is performed in each of the main and subordinate scanning directions. When the inputted binary image data (of pixel densities 8 pel/mm in the main scanning direction and 7.7 lines/mm in the subordinate scanning direction) is outputted, the circuit 200 subdivides the data (into pixel densities 16 pel/mm in the main scanning direction and 15.4 lines/mm in the subordinate scanning direction) and produces the output upon reversing the densities of the subdivided pixels in dependence upon the pattern of the peripheral pixels. Thus, contour smoothing of slanted line portions in character images or the like is performed.

As shown in FIGS. 29 and 30, the circuit 200 includes the line memories 211-215 which hold the inputted binary image data, the shift registers 22A-22Y, the density-value deciding circuit 230 which, based upon inputted matrix data, decides individual pixel densities resulting from the subdivision processing, and the line selector 240 for extracting, line by line in synchronization with the image clock CLK1, the individual items of image data which enter in parallel from the density-value deciding circuit 230. The operation of this circuit will now be described in detail with reference to the drawings. A case will be described in which doubling is performed in both the main and subordinate scanning directions, by way of example.

First, one line of binary image data in the main scanning direction is read in the line memory 211 of the line memory group, and this data is shifted, in line units, in the subordinate scanning direction in the following manner: line memory 212→213→214→215. The image data from the line memories 211-215 is read out in synchronization with CLK2 outputted by the timing control circuit 1 so that five pixels of parallel data in the subordinate scanning direction are shifted to respective ones of the shift registers 22Y, 22T, 22O, 22J, 22E. The five pixels of image data in the subordinate direction thus shifted in are shifted successively through the shift registers in synchronization with CLK2. Here matrix data of 5 lines×five pixels is extracted from the shift registers 22A-22Y, and this data is inputted to the density-value deciding circuit 230.

The density-value deciding circuit 230 outputs pixel data M11-M22, which is obtained by subdividing or breaking up a pixel of interest (the data in shift register 22M in this example), which is located at the center of the 5×5 array, into four parts and performing interpolation processing. The outputted data enters the line selector 240 in parallel fashion. The line selector 240 selects the image data of the output line and outputs the subdivided image data in synchronization with the output image clock CLK2. FIGS. 31 and 32 illustrate the details of the line selector 240.

In FIG. 31, the interpolated pixel data M11, M12, M21, M22 from the density-value deciding circuit 230 enters the multiplexers 241, 242 in synchronization with the image clock CLK2 of the pixel prior to subdivision. The pixel data (M11, M12 in this example) of the outputted line is selected by the multiplexers 241, 242, and the selected pixel data enters AND gates 243, 244. The pixel data (e.g., M11, M12) whose density has been doubled in the main scanning direction is successively selected in accordance with CLK2 by a selector constructed by the AND gates 243, 244 and the OR gate 245. The selected pixel data is finally delivered to the D-type flip-flop 246 which, in synchronization with the pixel clock CLK1, outputs image data (OUT in FIG. 32) that has been subdivided.

In a case where a decision flag from the image discriminating circuit 300 indicates a pseudo-half-tone in the density-value deciding circuit 230, the input data from the shift register 22M, which is that of the pixel of interest, is outputted to M11 through M22 as is. By virtue of this processing, in a case where it is determined that the pixel of interest is that of a pseudo-half-tone image, the data of the input pixel is outputted as is and contour smoothing, which has adverse side effects on pseudo-half-tones, is not carried out.

By repeating similar processing using the output of the density-value deciding circuit 230 as new matrix data, it is possible to obtain a high-density converted image whose density has been multiplied four-fold in the main and subordinate directions or eight-fold in the main and subordinate directions, etc.

Next, the relationship between the matrix data inputted to the density-value deciding circuit 230 and the outputted subdivided image data will be described in detail. FIG. 33 is a diagram showing a pixel of interest and subdivided pixels according to this embodiment. In FIG. 33, M represents the pixel of interest, A through Y represent referential pixels, and M11 through M22 represent subdivided pixels. FIGS. 34 through 36 illustrate patterns for deciding the density values of the individual subdivided pixels versus the density values of the referential pixels.

In FIGS. 34 through 36, no reference is made to the pixels crossed out. In the patterns which decide the density values, the referential pixels determine whether the pixel of interest is part of a slanted line, a portion which indicates a right angle, or some other portion. In FIGS. 34 and 35, (a) through (l) illustrate patterns for performing interpolation processing in a case where the pixel of interest is a white pixel. In case of (a), the referential pixels H and L in FIG. 33 are black and the referential pixels I and Q are white, wherein it is judged that the pixel of interest is part of a black slanted line whose inclination is tanθ=1. The density of M11 is reversed from white to black. Similarly, in case of (b) through (d), the pattern (a) is rotated successively 90° each time owing to symmetry. In case of (e), the referential pixels H, I and L in FIG. 6 are black and the referential pixel Q is white, wherein it is judged that the pixel of interest is part of a black slanted line whose inclination is tanθ=½. The densities of the two pixels M11 and M12 are reversed from white to black. In case of (f) through (h), the pattern (e) is rotated successively 90° each time owing to symmetry. In (i) through (l), the pattern (e) is flipped over and then rotated successively 90° each time. On the other hand, (m) through (t) illustrate patterns for performing interpolation processing in a case where the pixel of interest is a black pixel. In case of (m), the referential pixels G, H, I and J in FIG. 33 are white and the referential pixel Q is white, wherein it is judged that the pixel of interest is part of a white slanted line whose inclination is tanθ=⅓. The densities of the two pixels M11 and M12 are reversed from black to white. Similarly, in case of (n) through (p), the pattern is rotated successively 90° each time owing to symmetry. In case of (q) through (t), the pattern is flipped over and then rotated successively 90° each time.

The individual actions of interpolation processing in each pattern will now be described.

(1) Detection of inclination of slanted lines

In a case where the pixel of interest is a white pattern, as in patterns (a) through (l), the number of subdivided pixels reversed in density from white to black in patterns (a) through (d) differs from that in patterns (e) through (l). By thus detecting the inclination of a slanted line and changing the number of pixels which undergo a reversal in density depending upon a difference in inclination, an image whose contours are smoothed more effectively with regard to steeply inclined slanted lines and gently inclined slanted lines can be obtained.

(2) Preventing the cancellation of the interpolating effect in slanted lines having inclinations of tanθ=1, ½, 2

The inclination of the slanted-line detection pattern which undergoes density reversal in a situation where the pixel of interest is a white pattern as in (a) through (l) differs from that in a situation where the pixel of interest is a black pattern as in (m) through (t). When a pattern in which white and black are reversed with respect to individual pixels in the patterns (a) through (l) is used in a situation where the pixel of interest is a white pattern, the interpolation processing is cancelled out with regard to slanted lines tanθ=1, ½, 2. As a result, the steps of the slanted lines are merely shifted and the effect of interpolation is lost. Consequently, by changing the angle of slanted-line detection (performing processing with respect to tanθ=⅓ when the pixel of interest is black) between the case where the pixel of interest is a white pattern (a) through (l) and a case where the pixel of interest is a black pattern (m) through (t), it is possible to apply effective contour smoothing to slanted lines tanθ=1 and tanθ=2 as well.

(3) Preventing missing black slanted lines owing to a fine slanted-line judgment In a case where the pixel of interest is a black pattern, as in patterns (m) through (t), reference is made to G, I, Q, S shown in FIG. 33. However, when the pixel of interest is a white pattern, as in patterns (a) through (l), no reference is made to G, I, Q, S. In other words, contour smoothing is applied effectively to black slanted lines composed of connected individual dots, and no interpolation processing is applied to white slanted lines composed of connected individual dots. As a result, it is possible to prevent missing connections in fine, black slanted lines, which is a side effect of the contour smoothing of white slanted lines.

A circuit in which the above-described patterns are formed by logic circuitry is the density deciding circuit 230. This circuit is constructed as a logical operation unit for pixel density conversion. An example of another method is to use a ROM in which the outputs of the registers A through Y are adopted as 25-bit address inputs and the densities of M11 through M22 have been written in as data.

<Image Discriminating Circuit>

FIG. 37 is a diagram illustrating a specific example of the image discriminating circuit 300 according to this embodiment. As shown in FIG. 37, matrix data of six lines×six pixels is extracted by a line-memory group 510 and a shift-register group 520 in synchronization with the image clock CLK2, just as in the contour-smoothing enlargement circuit 200, and the matrix data is inputted to an image discriminating decision circuit 530. On the basis of the extracted matrix data, the image discriminating decision circuit 530 determines whether the pixel of interest resides in a character image area or a pseudo-half-tone image area and outputs the result as a decision flag.

It should be noted that the memories and shift registers can be used in economic fashion by employing the line memories 510 and shift registers 520 of the image discriminating circuit 300 as the line memories and shift registers of the contour-smoothing enlargement circuit 200 as well.

The image discriminating algorithm for implementing the image discriminating decision circuit 530 will now be described in detail.

(1) Decision based upon spatial frequency

In the area of a pseudo-half-tone image, the change in the density of a pixel is pronounced and the occurrence of this change does not exhibit directionality. However, the number of density changes in a character image is comparatively small and change in density appears only in a direction perpendicular to the contour. Accordingly, in this embodiment, image discrimination is performed based upon a difference in the occurrence of the density change.

As shown in FIG. 38, the number of instances in which there is a reversal in the density of neighboring pixels (situated at 30 locations in the main scanning direction and 30 locations in the subordinate scanning direction, as indicated by the arrows) in a referential matrix is counted. If the total number is greater than a fixed threshold value, this area is deemed to be a pseudo-half-tone image area. In the error-diffusion method for processing an image in which a character image has been mixed, the best results are obtained when the threshold value is "26".

(2) Decision based upon periodicity

In this method, a dither image obtained by the systematic dither method is adopted as the object and the dither image is discriminated from a character image based upon the special properties of the dither image. In a dither image, there are almost no high frequencies in most portions other than the edge portion, there are few instances in which the average gray level changes suddenly in block units, and the dither image possesses periodicity that is dependent upon a dither matrix. Accordingly, in case of a dither image based upon a 4×4 dither matrix used in a facsimile or the like, the dither image possesses periodicity every four pixels irrespective of the system of the dither matrix. Therefore, as shown in FIG. 39, a comparison is made of the density values of sets of every four pixels of the same type of surface (four sets of four pixels each and eight sets of two pixels each), for a total of 12 sets, an estimate is made as to whether all densities are equal or there is a change of one step, and it is decided that the image is a pseudo-half-tone image based upon the dither method in a case where density differs for only one set. Furthermore, in order to raise the accuracy of determination, joint use is made of a comparison of density values between lines, illustrated below.

In a 4×4 dither matrix, various methods such as bayer and fatting are available. In a case where the density values of respective pixels are compared in the main and subordinate scanning directions with regard to the 16 pixels within one matrix, there is a line in the four lines in which all four of the pixels are black, and there is never a case in which all four of the lines are white, irrespective of the method. As a result, in a case where there are lines in both the main scanning and subordinate scanning directions in which all four of the pixels are black and there is a line in which all four of the pixels are white, precedence is given to the decision that there is dither periodicity, and it is judged that the image is not a dither image. In addition, since a decision would be rendered that even a plain portion or an all-black portion possesses periodicity, this case is excluded.

(3) Decision based upon isolation of pixels

In this method, the object is a pseudo-half-tone image obtained by the error-diffusion method. Specifically, attention is directed to the fact that connected dots due to diffusion of dots, which is a characteristic of an image based upon the error-diffusion method, are few, and a decision based upon isolation of dots is made.

As shown in FIG. 40(a), the four pixels nearest the pixel of interest all of whose densities have been reversed are treated as isolated pixels. As shown in FIG. 40(b), the number of pixels judged to be isolated pixels with regard to the 16 pixels in the 4×4 block is counted and, if the sum total is greater than a fixed threshold value, this area is judged to be an image based upon the error-diffusion method. Good results are obtained if "2" is the threshold value in this case.

The image discriminating decision circuit 530 can be constructed to have excellent decision accuracy with respect to any image by constructing the circuits based upon the three above-described algorithms from logic gates, adders and comparators, respectively, and outputting the OR of three inputs of the respective results of decision as image discrimination decision flags. In a case where the threshold value is fixed, advantages are gained in terms of processing speed and the amount of hardware by constructing the circuit from a 36-bit RAM.

<Pixel Pulse-Width Control Circuit>

FIG. 41 is a diagram illustrating the specific construction of the pixel pulse-width control circuit 400. In FIG. 41, a memory 910 stores code data which indicates the amount of pixel pulse width (i.e., the length of black-pixel output time, which corresponds to the H level) to set with regard to a pattern comprising three pixels in the main scanning direction in the vicinity of a pixel of interest having the pixel density (8 pel/mm) prior to enlargement processing obtained by sampling in accordance with the pixel clock CLK2.

A pattern generator 940 comprises a shift register 941 and a decoder 942. In the shift register 941, the image data following contour-smoothing enlargement processing is resampled at the clock CLK2, peripheral-pixel pattern data comprising three pixels in the main scanning direction of the pixel density (8 pel/mm) prior to enlargement processing is generated and outputted to the decoder 942, and a pixel pulse-width control-direction flag, described below, is outputted to a data selecting multiplexer 930. The decoder 942 decodes the data from the shift register 942 and delivers the decoded data to a data selecting multiplexer 920, described later. The data selecting multiplexer 920 receives the data from the decoder 942 as an input, uses the data as an address and outputs a code, which has been stored in the memory 910, to the data selecting multiplexer 930. In accordance with the pixel pulse-width control-direction flag outputted by the shift register 941, the data selecting multiplexer 930 selects one series from the pulse width series of the two series (A and B series, in which the time during which the pulse level is H differs depending upon whether it is in front or in back) shown in FIG. 43 and generated by a pixel pulse-width generator 950, described below. By virtue of this operation, the contour smoothing effect of the contour-smoothing enlargement circuit 200 is retained. The pulse width corresponding to the code in each series is selected by the code data outputted by the data selecting multiplexer 920, and the selected pulse width is outputted as a mask signal.

The pixel pulse-width generator 950 comprises a shift register 951 external-OR gates and external-NOR gates. On the basis of the clocks CLK0, CLK3 outputted by the timing control circuit 100, the generator 950 outputs clocks, whose pulse-widths and phases differ, as shown at (a) through (k) in FIG. 45, to the data selecting multiplexer 930. The subdivided-image signal of the pixel of interest properly timed by the image signal delay circuit 960 enters an AND gate 970, where it is subjected to mask processing using the mask signal outputted by the data selecting multiplexer 930. As a result, the pixel pulse width is controlled. The image signal whose pixel pulse width is has thus been controlled is outputted by a D-type flip-flop 980 in synchronization with CLK0.

The operation of the pixel pulse-width control circuit 400 constructed as set forth above will now be described.

In this embodiment, the aforementioned memory 910 is a 3×8 bit data register. Prior to the start of operation, three-bit binary pixel pulse-width codes corresponding to the density patterns of four pixels in the main scanning direction of the input image data (8 pel/mm) shown in FIG. 42 are written in the memory 910.

The density patterns are patterns 1 through 8, in conformity with the densities of the peripheral pixels and the density of the pixel of interest, each of which is composed of three pixels ① through ③ which bracket the pixel of interest in the main scanning direction, with the two pixels ① and ② being located in front of the pixel of interest and the pixel ③ being located in back of the pixel of interest. The pixel pulse-width codes corresponding to these patterns 1 through 8 are set at will. On the assumption that one dot of 8 pel/mm is the original pulse width 100, as shown in FIG. 43(a), 100 is adopted as code 1. Similarly, 83.3 is adopted as code 2, 66.7 as code 3, 50.0 as a code 4, 33.3 as a code 5, and 26.7 as a code 6. These codes correspond to the pulse durations (the times during which the level is "H") of the black pixels.

In FIGS. 41 and 44, image data of a pixel density of 16 pel/mm doubled in density in the main scanning direction and outputted by the contour-smoothing enlargement circuit 200 enters the input A of shift register 941. As shown in FIG. 44, the input image is sampled and shifted in accordance with the 8 pel/mm one-bit synchronizing clock CLK2 outputted by the timing control circuit. The shift data resampled at the pixel density of 8 pel/mm shown at $Q_A$–$Q_D$ in FIG. 44 is outputted in synchronization with the leading edge of CLK 2 and enters the decoder 942 and the data selecting multiplexer 930. Here $Q_A$, $Q_C$, $Q_D$ are patterns generated in correspondence with the above-mentioned peripheral pixels ③, ②, ① whose pixel density is 8 pel/mm. The output of $Q_B$ is a one-bit signal which represents a pixel pulse-width control-direction flag. As shown in FIG. 44, the $Q_B$ data is obtained by sampling data on the L side of the pixel-of-interest data in which the 8 pel/mm pixel data has been interpolated to 16 pel/mm in the contour-smoothing enlargement circuit 200. When this signal is "H", the interpolation pattern of the A series shown in FIG. 43(b) is selected. When the signal is "L", the interpolation pattern of the B series is selected.

Accordingly, the design is such that the mask signal of the series corresponding to the interpolation pattern of the pixel of interest is selected, by the output $Q_B$, from the mask signals of pixel pulse-width control shown in FIG. 43(a). This makes it possible to prevent cancellation of the effect of contour-smoothing enlargement.

Next, the data $Q_A$, $Q_C$, $Q_D$ representing the patterns of the peripheral pixels prior to contour-smoothing expansion are inputted to the decoder 942, which decodes an address according to which the data selecting multiplexer 920 selects one relevant pattern from the patterns 1 through 8 in memory 910. The address is outputted to the data selecting multiplexer 920. The pixel pulse-width code corresponding to each of the patterns 1 through 8 is selected by the data selecting multiplexer 920 and outputted to the data selecting multiplexer 930.

Meanwhile, in the pixel pulse-width generator 950, CLK0, CLK3 from the timing control circuit 100 are inputted to the shift register 951 as a shift clock and data, respectively, data obtained by shifting CLK3 is generated, and the exclusive-OR and exclusive-NOR are taken of the CLK3 shift data and CLK3 input data, thereby producing pixel pulse-width timing signals (a) through (k) in FIG. 45. These signals are outputted to the data selecting multiplexer 930. In the data selecting multiplexer 930, one of the pixel pulse-width timing signals is selected, in accordance with the pixel pulse-width timing signal inputted from the pixel pulse-width generator 950, the aforementioned pixel pulse-width control-direction flag from the eleven types of the two series, and the pixel-pulse width. The selected timing signal is delivered to the AND gate 970 as the mask signal. Next, the AND gate 970 takes the AND between the mask signal and the two pixels of interest of 16 pel/mm outputted at the proper timing by the image signal delay circuit 960.

Figure 46B:
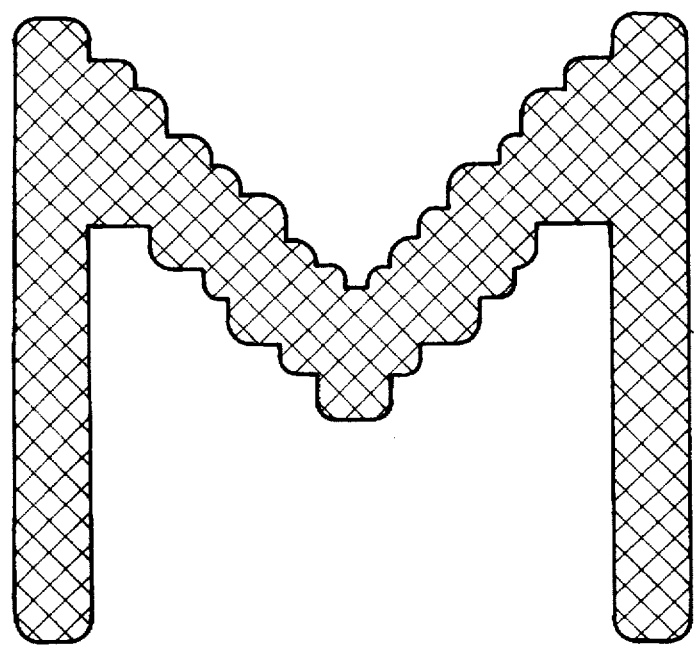

FIG. 46(a) is a diagram showing an example of an output from a conventional laser-beam printer. This is an example in which image data of 8 pel/mm×7.7 lines/mm is simply enlarged four times to 16 pel/mm×15.4 lines/mm. As illustrated, vertical lines are thickened only and slanted lines develop a conspicuous step-like appearance. By contrast, FIG. 46(b) is a diagram showing an example of an output from a laser-beam printer according to this embodiment. Here vertical lines are outputted as fine lines and the steps in the slanted lines are made less conspicuous by interpolation. Since pixel pulse width is set at will with regard to each pattern in the pixel pulse-width control circuit 400, codes conforming to the characteristics of the image output unit can be set with respect to the various patterns. In particular, the density of pseudo-half-tones can be corrected in dependence upon the output unit.

In accordance with the embodiment described above, an output which exploits the resolution and characteristics of the output unit can be obtained with regard to a binary image in which pseudo-half-tone images and character images are mixed. Correction processing conforming to the characteristics of the output unit becomes possible without sacrificing the effects of interpolation processing on characters. In addition, communication time can be shortened and a higher picture quality can be obtained by applying this embodiment to a facsimile apparatus in which the duration of pixel output is capable of being controlled.

In accordance with this embodiment, as described above, even fine lines can be faithfully reproduced, as well as the density of portions of one pixel only, without detracting from the contour smoothing of character images and without blackening of the entire image of a pseudo-half-tone image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for raising the pixel density of an input binary image and performing interpolation, comprising:

processing means for subdividing one pixel of the input binary image in a main scanning direction and in a subordinate scanning direction, to produce sub-pixels from the pixel subdivided by said processing means;

processing means for deciding pixel density of a sub-pixel of a pixel of interest, which has been subdivided by said processing means for subdividing, based upon a density value of the pixel of interest and density values of pixels peripheral thereto; and output means for outputting image data of the sub-pixel of the pixel of interest in the pixel density decided by said processing means for deciding, wherein said output means selects a dot of one dot size from among at least three dot sub-pixel sizes as the image data, the dot sub-pixel sizes being different from each other in recording width, and wherein said output means selects a dot of a first one of the dot sub-pixel sizes when density values of peripheral pixels are high and selects a dot of a second one of the dot sub-pixel sizes when density values of peripheral pixels are low, the first dot sub-pixel size being larger in recording width than is the second dot sub-pixel size.

2. The apparatus according to claim 1, wherein said second processing means detects the width of a slanted line which is the object of interpolation processing, and controls, in dependence upon the width of said slanted line, the processing of density conversion for interpolation processing.

3. The apparatus according to claim 1, wherein said processing means for deciding detects an angle of inclination of a slanted line which is the object of interpolation processing, and varies the number of sub-pixels which undergo a density conversion for interpolation processing, in dependence upon the angle of inclination.

4. The apparatus according to claim 1, further comprising means for detecting a pattern of the input image, wherein said output means selects the dot size of the sub-pixel in dependence upon the detected pattern of the input image.

5. The apparatus according to claim 4, wherein said output means controls timing for outputting the image data of the sub-pixel to select the dot sub-pixel size.

6. The apparatus according to claim 1, further comprising means for detecting a slanted fine line from the input image, wherein, when said detecting means has detected the slanted fine line, said output means outputs the image data of the sub-pixel without performing the selection of the dot sub-pixel size.

7. An image processing apparatus comprising:

input means for inputting binary image data;

detecting means for detecting the pattern of the binary image data inputted by said input means;

discriminating means for discriminating whether a pixel of interest is contained in a slanted fine line; and output means for converting the image data of one pixel into image data of a plurality of sub-pixels and outputting image data of the plurality of sub-pixels in dependence upon pattern information detected by said detecting means, wherein, when said discriminating means has discriminated that the pixel of interest is not contained in a slanted fine line, said output means selects a dot of one dot size from among at least three dot sub-pixel sizes as the image data, the dot sub-pixel sizes being different from each other in recording width, wherein said output means selects a dot of a first dot sub-pixel size from among the dot sub-pixel sizes when density values of peripheral pixels are high, and selects a dot of a second dot sub-pixel size, smaller in recording width than the first dot sub-pixel size, from among the dot sub-pixel sizes, when density values of peripheral pixels are low, and wherein, when said discriminating means has discriminated that the pixel of interest is contained in a slanted fine line, said output means outputs the image data of the pixel of interest without controlling the dot size the image data.

8. The apparatus according to claim 7, wherein said input means inputs binary image data in which a character image and a pseudo-half-tone image are mixed.

9. An image processing method for raising the pixel density of an input binary image and performing interpolation, comprising the steps of:

subdividing one pixel of the input binary image in a main scanning direction and in a subordinate scanning direction, to produce sub-pixels of the pixel;

deciding pixel density of a subdivided pixel of a pixel of interest, which has been subdivided in said subdividing step, based upon a density value of the pixel of interest and density values of pixels peripheral thereto; and outputting the image data of the sub-pixel the pixel of interest in the pixel density decided in said deciding step, wherein, in said outputting step, there is selected a dot of one dot sub-pixel size from among at least three dot sub-pixel sizes as the image data, the at least three dot sub-pixel sizes being different from each other in recording width, and wherein said outputting step includes selecting a dot of a first one of the dot sub-pixel sizes when density values of peripheral pixels are high and selecting a dot of a second one of the dot sub-pixel sizes when density values of peripheral pixels are low, the first dot sub-pixel size being larger in recording width than is the second dot sub-pixel size.

10. An image processing method comprising the steps of:

inputting binary image data;

detecting the pattern of the image data inputted in said inputting step;

discriminating whether a pixel of interest is contained in a slanted fine line; and converting the image data of one pixel into image data of a plurality of sub-pixels and outputting image data of the plurality of sub-pixels in dependence upon pattern information detected in said detecting step, wherein, when it has been discriminated in said discriminating step that the pixel of interest is not contained in a slanted fine line, there is selected a dot of one dot sub-pixel size from among at least three dot sub-pixel sizes as the image data, the dot sub-pixel sizes being different from each other in recording width, wherein said selecting includes selecting a dot of a first dot sub-pixel size from among the dot sub-pixel sizes when density values of peripheral pixels are high, and selecting a dot of a second dot sub-pixel size, smaller in recording width than is the first dot sub-pixel size, from among the dot sub-pixel sizes, when density values of peripheral pixels are low, and wherein, when it has been discriminated in said discriminating step that the pixel of interest is contained in a slanted fine line, the density level of the image data is not controlled and the image data is outputted in said outputting step.

11. An image processing apparatus comprising:

input means for inputting binary image data of first pixel density;

conversion means for converting the binary image data of one pixel of a first pixel density into image data of a plurality of sub-pixels of a second pixel density, said conversion means performing processing for smoothing a slanted line; and output means for selecting a dot of one dot size from among at least three dot sub-pixel sizes of the second pixel density, the dot sub-pixel sizes being different from each other in recording width, wherein said output means selects a dot of a first dot sub-pixel size from among the dot sub-pixel sizes, when density values of peripheral pixels are high, and selects a dot of a second act sub-pixel size from among the dot sub-pixel sizes, when density values of peripheral pixels are low, the first dot sub-pixel size being larger in recording width than is the second sub-pixel dot size.

12. The apparatus according to claim 11, further comprising discrimination means for discriminating whether the image data inputted by said input means is character image data or half-tone image data, wherein, when said discrimination means has discriminated that the image data is character image data, said conversion means performs the smoothing process for smoothing a slanted line, and converts the image data of first pixel density into the image data of second pixel density.

13. An image processing apparatus comprising:

input means for inputting binary image data of a first pixel density;

conversion means for converting the binary image data of one pixel of the first pixel density into image data of a plurality of sub-pixels of a second pixel density;

output means for outputting the image data of the second pixel density; and discrimination means for discriminating whether or not the image data inputted by said input means is a part of a slanted fine line, wherein, when said discrimination means has discriminated that the image data inputted by said input means is not a part of a slanted fine line, said output means selects a dot of one dot sub-pixel size from among at least three dot sizes as said image data, the dot sub-pixel sizes being different from each other in recording width, and wherein said output means selects a dot sub-pixel size of a first recording width from among the dot sub-pixel sizes when density values of peripheral pixels are high, and selects a dot of a second dot sub-pixel size from among the dot sub-pixel sizes, when density values of peripheral pixels are low, the first dot sub-pixel size having a larger recording width than does the second dot sub-pixel size.

14. The apparatus according to claim 13, further comprising detection means for detecting a pattern of a plurality of image data inputted by said input means, wherein said output means controls the density level of the image data of second pixel density in dependence upon the pattern detected by said detection means and outputs the image data of second pixel density.

* * * * *

UNITED STATES PATENT AND TRADEMARK OFFICE
CERTIFICATE OF CORRECTION

PATENT NO. : 5,721,793

DATED : February 24, 1998

INVENTOR(S): KATSUTOSHI USHIDA ET AL.  Page 1 of 2

It is certified that error appears in the above-identified patent and that said Letters Patent is hereby corrected as shown below:

In the Drawing:

SHEET 22

Fig. 22, "SIFT" should read --SHIFT--.

SHEET 41

Fig. 41, "SLEIECTING" should read --SELECTING--.

On the title page: Item

[73] ASSIGNEE

"Canon Kabushiki Kaisha, Japan" should read
--Canon Kabushiki Kaisha, Toyko, Japan--.

[57] ABSTRACT

Line 10, "(or sub-pixel)" should be deleted; and
"pixel of a" should read --pixel (or sub-pixel) of the--.

Line 19, "tion" should read --tion processing--, and "processing" should be deleted.

COLUMN 1

Line 34, "peripheral pixel" should read --peripheral-pixel--.

COLUMN 11

Line 10, "an" should be deleted.

UNITED STATES PATENT AND TRADEMARK OFFICE
CERTIFICATE OF CORRECTION

PATENT NO. : 5,721,793
DATED      : February 24, 1998
INVENTOR(S): KATSUTOSHI USHIDA ET AL.          Page 2 of 2

It is certified that error appears in the above-identified patent and that said Letters Patent is hereby corrected as shown below:

<u>COLUMN 18</u>

Line 24, "is has" should read --has--.

<u>COLUMN 21</u>

Line 40, "sub-pixel" should read --sub-pixel of--.

<u>COLUMN 22</u>

Line 34, "act" should read --dot--.

<u>COLUMN 23</u>

Line 3, "sizes" should read --sizes,--.

Signed and Sealed this

Eighteenth Day of August, 1998

*Attest:*

BRUCE LEHMAN

*Attesting Officer*      *Commissioner of Patents and Trademarks*